(12) United States Patent
Rausch

(10) Patent No.: US 8,744,855 B1
(45) Date of Patent: Jun. 3, 2014

(54) DETERMINING READING LEVELS OF ELECTRONIC BOOKS

(75) Inventor: Daniel B. Rausch, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 778 days.

(21) Appl. No.: 12/853,076

(22) Filed: Aug. 9, 2010

(51) Int. Cl.
*G10L 21/00* (2013.01)

(52) U.S. Cl.
USPC ............. 704/270; 704/9; 704/256; 704/10; 717/100; 707/748; 707/739; 705/14.66; 700/94; 434/178; 434/156; 382/321; 345/471; 235/375

(58) Field of Classification Search
CPC ............ G06F 17/2795; G06F 17/2715; G06F 17/30867; G06Q 30/0269; G10L 15/265; H04N 21/44222; G06K 9/6297
USPC ................. 704/9; 717/100; 434/178
See application file for complete search history.

(56) References Cited

U.S. PATENT DOCUMENTS

| | | | | |
|---|---|---|---|---|
| 4,764,976 | A * | 8/1988 | Kallin et al. | 382/321 |
| 5,146,552 | A | 9/1992 | Cassorla et al. | |
| 5,359,514 | A | 10/1994 | Manthuruthil et al. | |
| 5,486,111 | A | 1/1996 | Watkins | |
| 5,649,826 | A | 7/1997 | West et al. | |
| 5,957,693 | A * | 9/1999 | Panec | 434/178 |
| 6,370,498 | B1 | 4/2002 | Flores et al. | |
| 6,438,515 | B1 | 8/2002 | Crawford et al. | |
| 6,683,611 | B1 * | 1/2004 | Cleveland | 345/471 |
| 6,816,830 | B1 * | 11/2004 | Kempe | 704/9 |
| 6,953,343 | B2 * | 10/2005 | Townshend | 434/178 |
| 7,136,877 | B2 * | 11/2006 | Volcani et al. | 704/10 |
| 7,270,546 | B1 | 9/2007 | Adams, Jr. et al. | |
| 7,313,513 | B2 | 12/2007 | Kinder | |
| 7,386,453 | B2 * | 6/2008 | Polanyi et al. | 704/270 |
| 7,483,871 | B2 * | 1/2009 | Herz | 1/1 |
| 7,801,721 | B2 | 9/2010 | Rosart et al. | |
| 7,801,896 | B2 * | 9/2010 | Szabo | 707/739 |
| 7,818,164 | B2 | 10/2010 | Wood et al. | |
| 7,905,391 | B1 * | 3/2011 | Shilling | 235/375 |
| 7,912,717 | B1 * | 3/2011 | Galick | 704/256 |
| 7,974,714 | B2 * | 7/2011 | Hoffberg | 700/94 |
| 8,171,032 | B2 * | 5/2012 | Herz | 707/748 |
| 2002/0120635 | A1 | 8/2002 | Joao | |
| 2002/0182578 | A1 | 12/2002 | Rachman et al. | |
| 2002/0199166 | A1 * | 12/2002 | Volcani et al. | 717/100 |
| 2003/0068603 | A1 | 4/2003 | Cupp | |
| 2003/0093275 | A1 | 5/2003 | Polanyi et al. | |
| 2003/0152894 | A1 * | 8/2003 | Townshend | 434/178 |
| 2004/0067472 | A1 | 4/2004 | Polanyi et al. | |

(Continued)

OTHER PUBLICATIONS

Final Office action for U.S. Appl. No. 12/165,049 mailed on Aug. 28, 2012, Lattyak, "Providing Progressive Language Conversion for Digital Content on an Electronic Device", 21 pages.

(Continued)

*Primary Examiner* — Michael Colucci
(74) *Attorney, Agent, or Firm* — Lee & Hayes, PLLC

(57) ABSTRACT

Architectures and techniques are described to determine a reading level of an electronic book. In particular, words, phrases, clauses, and parts of speech of an electronic book may be tagged and used to determine the reading level of the electronic book. In some cases, the reading level of the electronic book is based on a level of complexity of sentences of the electronic book and a level of complexity of words of the electronic book.

25 Claims, 11 Drawing Sheets

(56) References Cited

U.S. PATENT DOCUMENTS

| | | |
|---|---|---|
| 2004/0117728 A1 | 6/2004 | Gromer |
| 2004/0253568 A1 | 12/2004 | Shaver-Troup |
| 2005/0039121 A1 | 2/2005 | Cleveland |
| 2005/0131762 A1* | 6/2005 | Bharat et al. ............... 705/14 |
| 2005/0193335 A1 | 9/2005 | Dorai et al. |
| 2007/0011005 A1 | 1/2007 | Morrison et al. |
| 2007/0067294 A1 | 3/2007 | Ward et al. |
| 2007/0292826 A1* | 12/2007 | Goddy et al. ............... 434/156 |
| 2008/0070205 A1 | 3/2008 | Amick et al. |
| 2008/0140412 A1* | 6/2008 | Millman et al. ............... 704/270 |
| 2008/0229190 A1 | 9/2008 | Johnson |
| 2009/0092952 A1 | 4/2009 | Schlanger et al. |
| 2009/0246744 A1 | 10/2009 | Lofthus et al. |
| 2009/0263778 A1 | 10/2009 | Berger et al. |
| 2010/0153889 A1 | 6/2010 | Krause |
| 2010/0299205 A1 | 11/2010 | Erdmann et al. |
| 2011/0175805 A1 | 7/2011 | Rottler et al. |
| 2011/0306023 A1 | 12/2011 | Blank et al. |
| 2012/0030587 A1 | 2/2012 | Ketkar |
| 2012/0047455 A1 | 2/2012 | Yuan et al. |
| 2012/0088211 A1 | 4/2012 | Massaro |
| 2012/0233539 A1 | 9/2012 | Reed |
| 2012/0293529 A1 | 11/2012 | Che et al. |
| 2013/0080881 A1 | 3/2013 | Goodspeed et al. |
| 2013/0097164 A1 | 4/2013 | Welinder et al. |
| 2014/0019553 A1 | 1/2014 | Bill |

OTHER PUBLICATIONS

Office action for U.S. Appl. No. 12/853,038, mailed on Dec. 21, 2012, Rausch, "Providing Electronic Books According to Reading Capability", 15 pages.

Non-Final Office Action for U.S. Appl. No. 12/165,049, mailed on May 1, 2012, John Lattyak, "Providing Progressive Language Conversion for Digital Content on an Electronic Device" 15 pages.

Office Action for U.S. Appl. No. 13/345,452, mailed on Nov. 4, 2013, Rainer V. Mager, "Selective Display of Pronunciation Guides in Electronic Books", 25 pages.

Office action for U.S. Appl. No. 12/165,049, mailed on Aug. 23, 2013, Lattyak, "Providing Progressive Language Conversion for Digital Content on an Electronic Device", 16 pages.

Office Action for U.S. Appl. No. 13/308,825, mailed on Sep. 18, 2013, Inventor #1 Mehal H. Shah, "Controlling the Rendering of Supplemental Content Related to Electronic Books" 22 pages.

Ribiere, et al., "The sBook: Towards Social and Personalized Learning Experiences", ACM, Oct. 2010, pp. 3-8.

Wikipedia, "Computer File", retrieved on Aug. 16, 2013, at http://web.archive.org/web/20060915135156/http://en.wikipedia.org/wiki/File_%28computer%29, Wikimedia Foundation, Inc., Sep. 6, 2006, 3 pages.

Final Office Action for U.S. Appl. No. 12/853,038, mailed on May 22, 2013, Rausch, "Providing Electronic Books According to Reading Capability", 19 pages.

U.S. Appl. No. 12/165,049, filed on Jun. 30, 2008, Lattyak, et al., "Providing Progressive Language Conversion for Digital Content on an Electronic Device".

Final Office Action for U.S. Appl. No. 12/165,049, mailed on Sep. 1, 2011, John Lattyak, "Providing Progressive Language Conversion for Digital Content on an Electronic Device" 14 pages.

U.S. Appl. No. 12/853,038, filed Aug. 9, 2010, Daniel B. Rausch, "Providing Electronic Books According to Reading Capability".

Final Office Action for U.S. Appl. No. 13/308,825, mailed on Mar. 31, 2014, Mehal H. Shah, Controlling the Rendering of Supplemental Content Related to Electronic Books, 18 pages.

Final Office Action for U.S. Appl. No. 13/345,452, mailed on Apr. 17, 2014, Rainer V. Mager, "Selective Display of Pronunciation Guides in Electronic Books", 24 pages.

* cited by examiner

DETERMINING READING LEVELS OF ELECTRONIC BOOKS

BACKGROUND

Publishers provide books for readers having a wide range of reading capabilities. In particular, publishers provide books having content that includes words and sentence complexities appropriate for readers with specific reading capabilities. For example, children's books may include short words and simple sentences, while textbooks targeted to university graduate students may include technical terms and complex sentences.

Additionally, books published for readers of different reading capabilities often do not include the same core content. Rather, books of different reading levels include different content with words and sentence complexity that correspond to the reading capabilities of a target audience. In order to provide similar content in books with different reading levels, a publisher may need to incur the expense and dedicate resources to publishing multiple versions of a book, where each version includes the same core content. For instance, a publisher may publish a full version of a book written by Fyodor Dostoevsky, as well as an abridged version of this book.

In an education context, schools, school districts, universities, and other educational entities may purchase different books for each level of reading capability of their students. In some cases, classes may have students with a wide range of reading capabilities and the reading capabilities of the students may change as a school year progresses. Educational entities typically provide a number of books of certain reading levels to classes based on estimates of the number of students at each reading level. However, the actual number of students at a particular reading level may differ from the estimates of the educational entity. Thus, at any given time, an educational entity may provide a class with too few books of one reading level and too many books of another reading level. As a result, some students may receive materials that are inappropriate for their reading capabilities and some materials may go unused.

Further, in some cases, electronic versions of books may be provided to readers. However, since an electronic version of a book corresponds directly to a printed version of the book, the reading level of the electronic version of the book is the same as the reading level of the printed version of the book. Consequently, electronic versions of the book including content at other reading levels are unavailable.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION OVERVIEW

Figure 1:
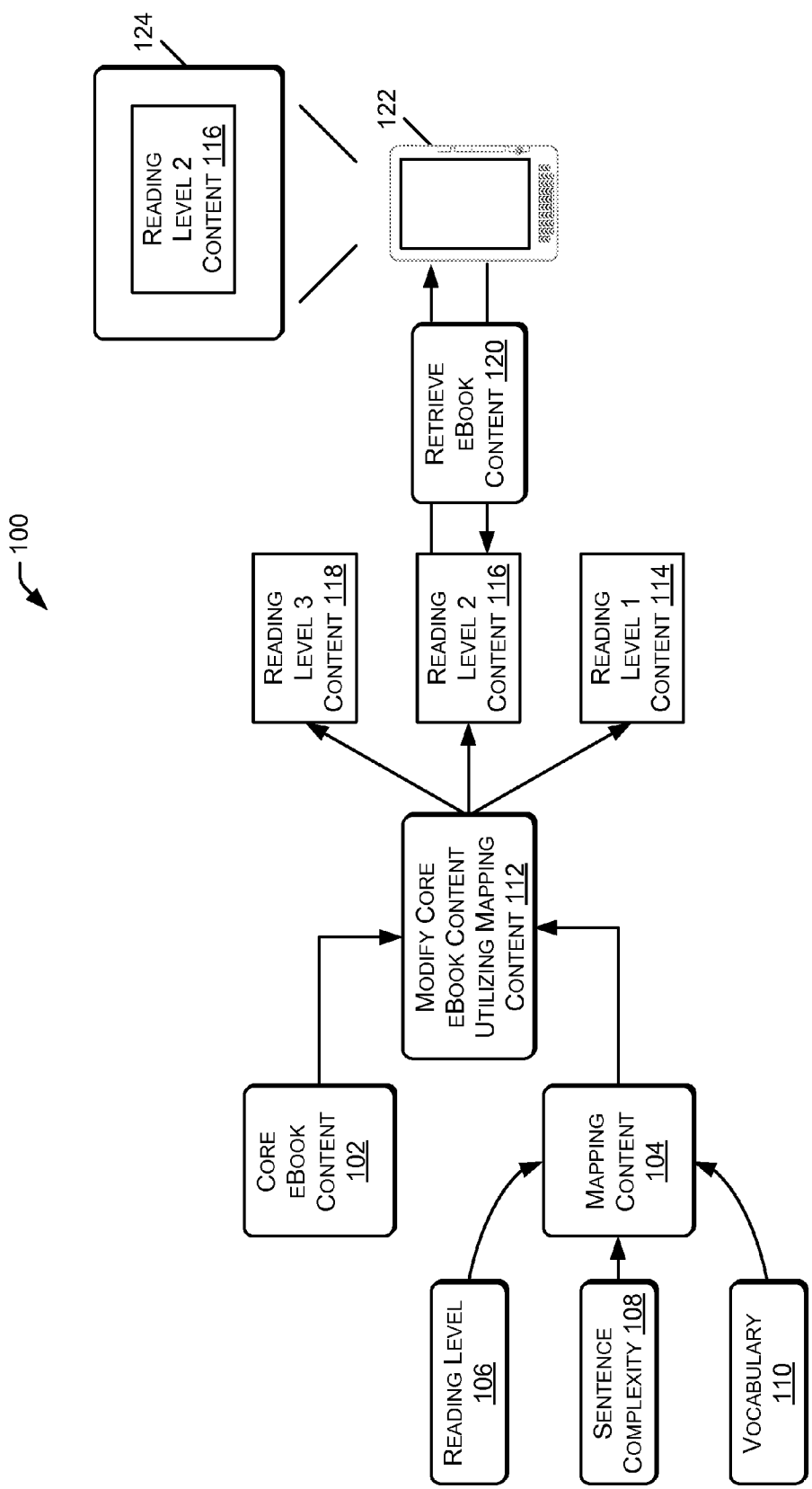
FIG. 1 illustrates producing versions of an electronic book having different reading levels and providing a version of the electronic book having a particular reading level via a client device.

This disclosure describes architectures and techniques to produce different respective versions of an electronic book according to different respective reading capabilities. This disclosure also describes architectures and techniques to provide one or more of these different versions of an electronic book having particular reading levels from a content provider to a client device. A content provider may utilize mapping content to convert core content of an electronic book to content having different reading levels. In some instances, the content provider obtains the mapping content from a publisher of the electronic book. In other cases, the content provider may produce the mapping content for a particular document based on dictionaries, thesauruses, and other documents.

To convert core content of an electronic book to content of a different reading level, words of the core content may be modified. For example, some words of the core content may be modified to reflect a higher reading level or a lower reading level. For example, the word "jog" may be replaced with the word "run" to decrease the reading level of the core content and "trot" to increase the reading level of the core content. The mapping content for the electronic book may provide substitute words that replace words of the core content to change the reading level of the core content.

In addition, core content of the electronic book may be converted to a different reading level by changing the complexity of sentences of the core content. In some cases, descriptive terms, such as adverbs and adjectives may be added to or deleted from sentences to modify a reading level of the core content. Additionally, phrases, such as noun phrases, verb phrases, adverb phrases, adjective phrases, prepositional phrases, idioms, and so on may be added to or removed from the core content to modify a reading level of the core content. For example, the core content may include the sentence "The dog ran fast" that is changed to "The dog ran like the wind." In this way, the idiom "like the wind" can replace the word "fast" to increase the reading level of the core content. Further, the punctuation of the core content may be modified to change the reading level of the core content.

A content provider may also assign a reading level to a particular document based on the content of a corpus of additional documents. In particular, the content provider may tag words and phrases of a particular document and compare the words and phrases of the document with words and phrases of additional documents of the corpus having a known reading level. In this way, the content provider can identify documents of the corpus associated with one or more reading levels that have words and phrases similar to the particular document and assign an appropriate reading level to the particular document.

A content provider or a client device can also determine reading capabilities of a client device user based on a reading capability assessment. The reading capability assessment may include reading level questions, such as reading comprehension questions, a determination of reading accuracy, a determination of reading speed, and so on. In some cases, the reading level questions are related to electronic books recently read by the client device user. In other situations, the reading level questions may be selected from predetermined content. The content provider can determine whether electronic books read by the client device user are appropriate for the reading level of the client device user based on the answers to the reading level questions, the reading accuracy of the client device user, and/or the reading speed of the client device user. The client device may modify electronic books provided to the client device user based on the identified reading level of the client device user.

By converting core content of electronic books to content of different reading levels, a content provider can produce electronic books at a variety of reading levels without incurring the expense of printing additional versions of the book with different words and sentence complexity. Additionally, educational entities can avoid purchasing books that are inappropriate with respect to the reading levels of students and avoid shortfalls or surpluses with respect to materials for students at certain reading levels. Further, the educational entities may modify a particular version for a student on-the-fly and as the needs and capabilities of that particular student change through a curriculum year. In particular, an educational entity can download additional versions of an electronic book and/or replace versions of an electronic book, as needed. Further, an educational entity may obtain core content and mapping content of an electronic book from a content provider or other source and produce various versions of an electronic book based on current reading levels of students.

Some implementations of the architecture and techniques described herein are described in the context of electronic books. The terms "electronic book" and/or "eBook," as used herein, may include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc. However, certain concepts described herein are also applicable to other types of digital content items, such as music, audio books, video, and other content items that people watch, listen to, or otherwise experience.

FIG. 1 illustrates producing versions of an electronic book having different reading levels and providing a version of the electronic book having a particular reading level via a client device. In particular, different versions of an electronic book may be produced based on core eBook content 102. The core eBook content 102 may include words and sentences associated with main ideas and concepts of a particular eBook. In some cases, the core eBook content 102 may express the main ideas and concepts of the particular eBook at a basic reading level. In other situations, the words and phrases of the core eBook content 102 may include words and sentences having a reading level different from a basic reading level, such as a reading level associated with an average reader of the electronic book.

Mapping content 104 may be utilized to produce versions of an electronic book having different reading levels. In a particular example, the mapping content 104 may be produced based on a number of reading levels 106, sentence complexity 108, and vocabulary 110. For instance, the mapping content 104 may indicate changes in sentence complexity 108 to modify the core eBook content 102 to another reading level. To illustrate, the mapping content 104 may specify phrases that can be added to, deleted from, or substituted to modify the reading level of the core eBook content 102. In addition, the mapping content 104 may indicate candidate sentences that can be modified via the insertion or deletion of a phrase and locations for phrases to be inserted into the sentences. The mapping content 104 may also specify changes in sentence complexity 108 based on the addition or removal of words, such as adjectives and adverbs. The mapping content 104 may indicate candidate nouns to be modified by particular adjectives and candidate verbs to be modified by specified adverbs. The phrases specified in the mapping content may be from the same language or dialect as the corresponding phrases of a particular version of the electronic book or from one or more different languages or dialects.

Additionally, the mapping content 104 may specify changes to vocabulary 110 of the core eBook content 102 to change the reading level of the core eBook content 102. For example, the mapping content 104 may specify alternate words that can be substituted for a particular word of the core eBook content 102 to change the reading level of the core eBook content 102, while retaining the meaning of the particular word. In some cases, the replacement words may be from the same language or dialect as the particular word, while in other cases, the replacement words may be from one or more different languages or dialects.

At 112, the core eBook content 102 is modified utilizing the mapping content 104 to produce versions of an eBook having different reading levels, such as reading level 1 content 114, reading level 2 content 116, and reading level 3 content 118. While FIG. 1 illustrates three example reading levels, other implementations may employ any other number of reading levels. In this example, the reading level 1 content 114 may represent eBook content at a more basic reading level than the reading level 2 content 116 and the reading level 3 content 118. For example, the vocabulary and sentence complexity of the reading level 1 content 114 may be typical of vocabulary and sentence complexity of books read by first and second grade students, while the vocabulary and sentence complexity of the reading level 2 content 114 may be typical of vocabulary and sentence complexity of books read by third, fourth, and fifth grade students. The vocabulary and sentence complexity of the reading level 3 content 118, meanwhile, may be typical of vocabulary and sentence complexity of books read by middle school students.

In an illustrative implementation, the core eBook content 102 may represent reading level 1 content 114 and simple words may be replaced by more complex words according to the mapping content 104 to produce reading level 2 content 116. In addition, adverbs, adjectives, and phrases may be added to the reading level 1 content according to the mapping content 104 to produce the reading level 2 content 116. In a similar manner, words and phrases of the reading level 2 content 116 may be modified and/or added according to the mapping content 104 to produce the reading level 3 content 118.

In another illustrative implementation, the core eBook content 102 may represent content having a reading level of an average reader of the core eBook content 102, such as the reading level 2 content 116. Thus, words and phrases of the reading level 2 content 116 may be simplified according to the mapping content 104 to produce the reading level 1 content 114. Further, the vocabulary level and sentence complexity of the reading level 2 content 116 may be increased to produce the reading level 3 content 118.

At 120, eBook content of a certain reading level may be retrieved by a client device 122. In the particular example shown in FIG. 1, the client device 122 retrieves reading level 2 content 116. The reading level 2 content 116 may be retrieved from memory of the client device 122. For example, the client device 122 may store eBook content of a variety of reading levels and provide the corresponding eBook content in response to a request for content of a particular reading level. In another implementation, the reading level 2 content 116 can be retrieved from a content provider or educational entity that sends the requested eBook content to the client device 122. Although, the client device 122 is shown in FIG. 1 as an electronic book reader device, the client device 122 may also include a desktop computer, a laptop computer, a tablet computer, a portable navigation system, a personal digital assistant (PDA), a portable media player, an entertainment device, a netbook, a gaming console, smart phones, mobile handsets, a DVD player, a media center, a household appliance, and the like.

Content Provider Architecture

Figure 2:
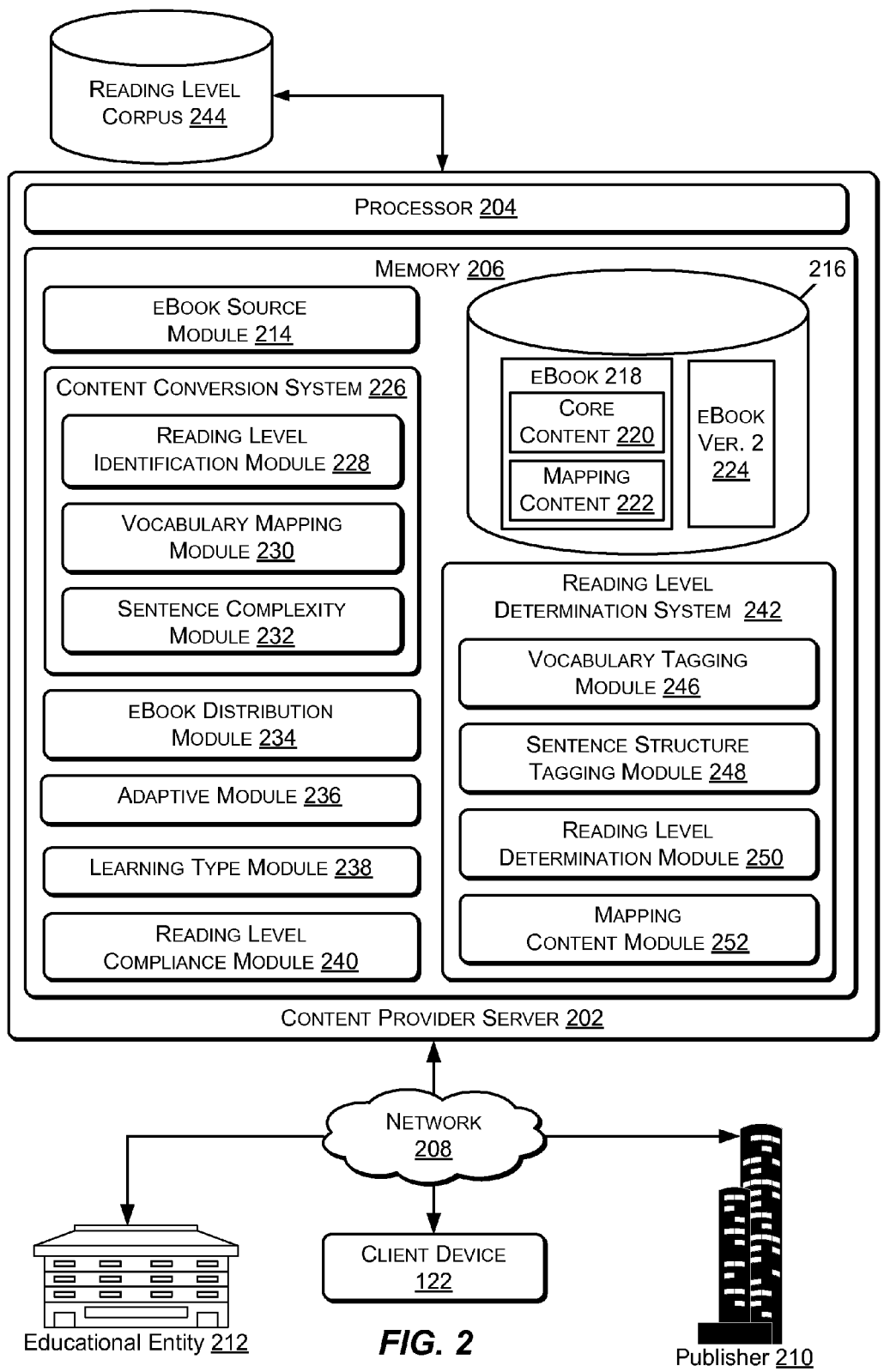
FIG. 2 is a block diagram illustrating components of a content provider server to produce versions of an electronic book having different reading levels and to provide particular versions of the electronic book to client devices.

FIG. 2 illustrates components of a content provider server 202 to produce versions of an electronic book having different reading levels and to provide particular versions of the electronic book to client devices, represented by a client device 122. The content provider server 202 may comprise a single server, a cluster of servers, a server farm or data center, and so forth, although other server architectures (e.g., a mainframe architecture) may also be used. In the example illustrated in FIG. 1, the content provider server 202 may be part of an online retailer that offers electronic books for purchase.

The content provider server 202 includes one or more processors indicated by the processor 204. The content provider server 202 also includes memory 206 that is accessible to the processor 204. The memory 204 is an example of computer readable storage media and may include volatile memory, nonvolatile memory, removable memory, non-removable memory, or a combination thereof. For example, the memory 206 may include, but is not limited to, RAM, ROM, EEPROM, flash memory, one or more hard disks, solid state drives, optical memory (e.g. CD, DVD), or other non-transient memory technologies. The memory 206 may store a number of modules including computer-readable instructions executable by the processor 204 to produce versions of electronic books having a number of reading levels and to provide versions of electronic books associated with particular reading levels to client devices.

The content provider server 202 may communicate with the client device 122 via a network 208. The network 208 may be representative of any one or combination of multiple different types of wired and wireless networks, such as the Internet, cable networks, satellite networks, wide area wireless communication networks, wireless local area networks, and public switched telephone networks (PSTN). Additionally, the content provider server 202 may communicate with one or more content sources, represented by the publisher 210, via the network 208. For example, the content provider server 202 may obtain electronic books from the publisher 210. Further, the content provider server 202 may communicate with an educational entity 212 via the network 208. The educational entity 212 may include a school, a school district, a university, another educational institution, a federal or state government agency, and so on. In a particular implementation, the educational entity 212 may purchase educational materials, such as textbooks, curriculum, workbooks, educational software, etc., from an online retailer via the content provider server 202. While FIG. 2 illustrates an educational entity 212, the content provider server 202 may communicate with any other type of entity in other implementations.

The memory 206 includes an eBook source module 214. The eBook source module 214 may obtain electronic books from a source, such as the publisher 210, and store the electronic books in a data store 216. For example, the eBook source module 214 may obtain the electronic book 218 from the publisher 210. The eBook source module 214 may also obtain other content related to electronic books from a source, such as updates to the electronic books, supplemental materials, etc.

In some cases, the eBook source module 214 may retrieve core content 220 and mapping content 222 associated with the electronic book 218. The core content 220 may be foundational content of the electronic book 218. In addition, the core content 220 may be associated with a particular reading level. For example, the core content 220 may include words and sentence complexity representative of the reading capability of the average reader of the electronic book 218. In another example, the core content 220 may include content representative of a minimum reading capability of readers of the electronic book 218. In some scenarios, the core content 220 may merely include a single version of the electronic book 218 made available for sale to the public by the publisher 208 via the content provider server 202, such as a particular novel, a particular textbook, a particular issue of a magazine, etc.

The mapping content 222 may be obtained from the publisher 208 of the electronic book 216, a third party, or, as explained below, the mapping content 222 may be produced via the content provider server 202. The mapping content 222 may specify changes to words and sentence complexity that modify the reading level of the core content 220. The mapping content 222 may also include rules for modifying words and sentence complexity to modify the reading level of the core content 220. For example, the rules may specify a particular sentence length limit for one or more reading levels.

In a particular implementation, the mapping content 222 may specify replacement words that can be substituted for corresponding words of the core content 220. In addition, the mapping content 222 may include words and/or phrases that can be added to the core content 220 or deleted from the core content 220 to modify a reading level of the core content 220. For example, the mapping content 222 may include nouns, verbs, adverbs, adjectives, noun phrases, verb phrases, adverb phrases, adjective phrases, prepositional phrases, dependent clauses, independent clauses, conjunctions, pronouns, idioms, etc., that can be added or removed from a sentence to increase or decrease the complexity of the sentence.

In addition, the mapping content 222 may indicate locations within sentences where words and/or phrases can be added or removed. In one illustrative example, the mapping content 222 may specify adjectives that can be added to modify a particular noun and adverbs that can be added to modify a particular verb. Further, the mapping content 222 may specify changes to punctuation to alter the sentence complexity of the core content 220, such as the addition or removal of commas and/or semicolons from certain sentences.

Although one instance of the mapping content 222 is shown in FIG. 2, multiple instances of mapping content 222 for the electronic book 218 may be available. For example, the mapping content 222 may include a respective mapping content instance for each of a number of reading levels. In this way, a particular mapping content instance is utilized to produce a corresponding version of the electronic book 218 having a different reading level than the core content 220.

The data store 216 may also store a second version of the electronic book 224. The second version of the electronic book 224 may include words and sentence complexity associated with a reading level that is different from the reading level of the core content 220. The second version of the electronic book 224 may be obtained from the publisher 208 of the electronic book 218, a third-party, or, as explained below, the second version of the electronic book 218 may be produced via the content provider server 202 based on the mapping content 222 and the core content 220.

The memory 206 also includes a content conversion system 226 to produce a number of versions of electronics books with each version associated with a different reading level. In an illustrative example, the content conversion system 226 may produce the second version of the electronic book 224 from the core content 220 and the mapping content 222 of the electronic book 218. Other versions of the electronic book 218 having reading levels different from those of the second version of the electronic book 224 and the core content 220 may also be produced utilizing the core content 220 and the mapping content 222.

In a particular implementation, the content conversion system 226 includes a reading level identification module 228 to identify at least one reading level that is different from the reading level of the core content 220. This reading level may represent a reading capability that is higher or lower than the reading level of the core content 220. In some cases, the reading levels may be representative of reading levels of students of the educational entity 212, one or more users of the client device 122, or a combination thereof. For example, the reading level identification module 228 may receive a request for a version of the electronic book 218 associated with a particular reading level from the client device 122 and/or the educational entity 212. In other instances, the reading levels identified by the reading level identification module 228 may be predetermined. For example, an administrator of the content provider server 202 may provide the predetermined reading levels and invoke the content conversion system 226 to automatically produce different versions of the electronic book 218 to be stored in the data store 216 for subsequent distribution.

The content conversion system 226 also includes a vocabulary mapping module 230. The vocabulary mapping module 230 may identify words of the core content 220 that may be replaced with similar words, such as synonyms, associated with a different reading level based on the mapping content 222. For example, the vocabulary mapping module 230 may identify the word "sprint" in the core content 220 and determine from the mapping content 222 that "sprint" can be replaced with the word "run" in a version of the electronic book 218 having a reading level lower than the core content 220. In another example, the vocabulary mapping module 230 may determine from the mapping content 222 that "sprint" can be replaced with the word "lope" in a version of the electronic book 218 having a reading level higher than the core content 220.

Additionally, the content conversion system 226 includes a sentence complexity module 232. The sentence complexity module 232 may identify words and/or phrases that can be added to or deleted from the core content 220 to change the reading level of the core content 220. In one example, the sentence complexity module 232 may identify a simple sentence of the core content 220 and add one or more clauses to convert the simple sentence to a complex sentence, a compound sentence, or a complex-compound sentence to increase the reading level of the core content 220. In another example, the sentence complexity module 232 may add adjectives or adverbs to a sentence to increase the reading level of the sentence. Conversely, the sentence complexity module 232 may remove adjectives, adverbs, and/or phrases from a sentence to decrease the reading level of the sentence. Further, the sentence complexity module 232 may change the punctuation of sentences of the core content 220, such as by adding or removing commas and semicolons, to modify the reading level of sentences of the core content 220.

Although the content conversion system 226 is shown as a component of the content provider server 202, the content conversion system 226 may also be a component of the educational entity 212. For example, the educational entity 212 may purchase software, hardware, or a combination thereof, including the content conversion system 226 from a content provider.

The memory 206 also includes an eBook distribution module 234. The eBook distribution module 234 may provide versions of the electronic book 218 having particular reading levels to the client device 122, to the educational entity 212, or to a combination thereof. For example, the client device 122 and/or educational entity 212 may send a request to the content provider 202 to obtain a version of the electronic book 218 having a particular reading level. The eBook distribution module 234 may determine that the version having the requested reading level is the second version of the electronic book 224. Consequently, the eBook distribution module 234 may send the second version of the electronic book 224 to the client device 122 and/or the educational entity 212. In some cases, receiving a request from the client device 122 or educational entity 212 for a version of the electronic book 218 having a particular reading level may trigger execution of the content conversion system 226 to convert the core content 220 to the version of the electronic book 218 corresponding to the requested reading level utilizing the mapping content 222.

Further, the memory 206 includes an adaptive module 236 to identify a reading level of a particular individual and provide a version of the electronic book 118 having content appropriate for the reading capabilities of the particular individual. The particular individual may be a user of the client device 122, a student of the educational entity 212, or a combination thereof. In an illustrative implementation, the adaptive module 236 may perform a reading capability assessment for the particular individual. The reading capability assessment may include a series of reading level questions, such as reading comprehension questions, provided to the client device 122 or educational entity 212. In some cases, the reading level questions may be related to one or more electronic books that the particular individual recently read. In other instances, the reading level questions may be predetermined based on content approved by the educational entity 212 that is also provided to the particular individual along with the corresponding reading level questions. The reading capability assessment may also include tests to determine reading speed and reading accuracy.

Based on the answers to the reading level questions and the results of the reading speed and reading accuracy tests, the adaptive module 236 may determine a current reading level of the particular individual. The current reading level of the individual may be higher or lower than a previous reading level of the individual. After determining the reading level of the particular individual, the adaptive module 236 may invoke the eBook distribution module 234 to identify a version of an electronic book 218 appropriate for the reading capabilities of the particular individual and provide the identified version of the electronic book 218 to the client device 122 and/or the educational entity 212.

In addition, the memory 206 includes a learning type module 238 to determine a learning type of a particular individual, such as a user of the client device 122, a student of the educational entity 212, or a combination thereof. For example, by evaluating answers to questions regarding learning type, the learning type module 238 may determine whether the particular individual is a visual learner or an auditory learner. Based on the learning type of the particular individual, the learning type module 238 may identify a version of a requested electronic book, such as a version of the electronic book 218, that includes content appropriate for the learning type of the particular individual.

The learning type module 238 may also add content to the core content 220 and/or to the second version of the electronic book 224 to adapt the content of the electronic book 218 for different learning types. In one example, the learning type module 238 may add images and/or video to the core content 22 and/or to the second version of the electronic book 224 to accommodate a visual learner. To illustrate, the learning type module 238 may insert an image of a car inline with the words of a sentence when the word "car" or "automobile" is present in the sentence. The learning type module 238 may also add images and/or video that represent the main idea of a sentence. For example, the learning type module 238 may insert an image of the sun rising proximate to the sentence, "The sun is rising." In another example, the learning type module 238 may insert links that play an audio version of a word, sentence, and/or page of the electronic book 218 to accommodate auditory learners.

A learning type of an individual may also refer to a level of interest of an individual with respect to particular content. For example, some individuals that are indifferent to the content of the electronic book 218 may be labeled as "casual learners," while individuals with a fervent interest in content of the electronic book 218 may be labeled as "knowledge seekers." The higher an individual's level of interest in the content of the electronic book 218, the more material that may be provided in a particular version of the electronic book 218. To illustrate, when an individual has a high level of interest in the content of the electronic book 218, the learning type module 238 may add links to the core content 220 and/or the second version of the electronic book 224, where the links are directed to websites or additional documents that provide more information regarding the content of the electronic book 218. On the other hand, when an individual has a low level of interest in the content of the electronic book 218, supplemental information may not be added to the eBook core content 220 and/or the second version of the electronic book 224. In some scenarios, a level of interest of an individual may be determined based on a user profile, answers to a questionnaire, content of other electronic books purchased or otherwise consumed by the individual, or a combination thereof.

The reading level compliance module 240 stored in the memory 206 may determine whether a version of an electronic book complies with particular reading level standards and may modify content of the electronic book to bring the electronic book into compliance with the particular reading level standards. In an illustrative implementation, a school, university, school district, state agency, national agency, or other educational entity may have standards for the vocabulary, sentence complexity, phonics, etc. that define a particular reading level. The reading level compliance module 240 may examine the content of a particular electronic book, such as the electronic book 218, and determine whether the core content 220 complies with the standards for a particular reading level. When the core content 220 does not comply with a particular standard, the reading level compliance module 240 may modify the core content 220 in conjunction with the mapping content 222 to produce another version of the electronic book 218 that does comply with the particular standard. In some cases, one or more instances of the mapping content 222 may be related to standards of one or more educational entities.

The memory 206 also includes a reading level determination system 242 to determine a reading level of a document, such as the electronic book 218. In particular, the reading level determination system 242 may examine the content of the document with respect to a corpus of material, such as the reading level corpus 244, to determine a reading level of the document. The reading level corpus 244 may include a number of documents accessible to the content provider server 202. The documents of the reading level corpus 244 may include books, magazines, newspapers, periodicals, dictionaries, thesauruses, lexicons, journals, reference materials, telephone books, textbooks, anthologies, instruction manuals, proceedings of meetings, forms, directories, maps, web pages, etc.

In some cases, the documents of the reading level corpus 244 may be associated with a particular reading level. For example, a publisher may designate certain books included in the reading level corpus 244 as being appropriate for individuals having particular reading capabilities. In another example, a content provider, educational entity, or other entity may designate some documents of the reading level corpus 244 as complying with a particular reading level standard that corresponds to particular reading capabilities. In an additional example, a reading level of some documents of the reading level corpus 244 may be inferred from an intended audience for the documents. To illustrate, a textbook for a university level English course may be associated with a reading level of university students and children's books may be associated with a reading level of young children.

The reading level determination system 242 includes a vocabulary tagging module 246 to tag words of documents of the reading level corpus 244 and to tag words of a document, such as the electronic book 218. In an illustrative implementation, the vocabulary tagging module 246 may tag words of documents of the reading level corpus 244 and determine that certain words are most often used in documents of a particular reading level, while other words are most often used in documents of another reading level. To illustrate, the vocabulary tagging module 246 may tag the word "constitution" in high school and university government textbooks and indicate that this word is likely to be associated with a high school or university reading level. In another illustration, the vocabulary tagging module 246 may tag the word "cat" in a variety of documents, including children's books, and indicate that this word is likely to be associated with the reading level of young children. The vocabulary tagging module 246 may also utilize the complexity of a word based on the length of a word and/or phonemes associated with the word to determine a reading level associated with the word.

The reading level determination system 242 also includes a sentence structure tagging module 248. The sentence structure tagging module 248 may tag phrases, clauses, parts of speech, etc. of documents of the reading level corpus 248 and of the electronic book 218. The sentence structure tagging module 248 may implement a Hidden Markov model or another type of statistical model to tag the phrases, clauses, parts of speech, etc. of the documents of the reading level corpus 244 and of the electronic book 218. In addition, the sentence structure tagging module 248 may indicate a reading level associated with particular clauses, phrases, and parts of speech. For example, the reading level associated with particular clauses, phrases, and parts of speech may indicate a version of the electronic book 218 that includes the particular clauses, phrases, and parts of speech and is associated with the reading level.

The sentence structure tagging module 248 may also provide a count of one or more parts of speech, phrases, and/or clauses. For example, the sentence structure tagging module 248 may tally the number of nouns, verbs, adverbs, adjectives, prepositions, conjunctions, independent clauses, dependent clauses, etc. of documents of the reading level corpus 244 and the electronic book 218.

Further, the reading level determination system 242 includes a reading level determination module 250 to determine a reading level of a document, such as the electronic book 218. The reading level determination module 250 may compare words of the electronic book 218 tagged by the vocabulary tagging module 246 with tagged words of the documents of the reading level corpus 244. Based, at least in part, on matches between the words of the electronic book 218 with words of the documents of the reading level corpus 244, the reading level determination module 250 may determine a reading level of the electronic book 218. Further, the reading level of the electronic book 218 may be determined according to the complexity of words of the electronic book 218 based on the length of the words, phonemes of the words, and so on.

Additionally, the reading level determination module 250 may compare clauses, phrases, and parts of speech of the electronic book 218 with clauses, phrases, and parts of speech of documents of the reading level corpus 244. Based, at least in part, on matches that occur between clauses, phrases, and parts of speech of the electronic book 218 with clauses, phrases, and parts of speech of the documents of the reading level corpus 244, the reading level determination module 250 may determine a reading level of the electronic book 218. In some cases, the reading level determination module 250 may also compare occurrences of certain parts of speech, clauses, and phrases of the electronic book 218 with occurrences of corresponding parts of speech, clauses, and phrases of documents of the reading level corpus 244 to determine the reading level of the electronic book 218. Further, the reading level of the electronic book 218 may be determined based in part on the complexity of sentences of the electronic book 218. The complexity of the sentences of the electronic book 218 may depend on the length of the sentences, parts of speech of the sentences, phrases of the sentences, clauses of the sentences, and so on.

The reading level determination system 242 includes a mapping content module 252 to produce mapping content for electronic books, such as the mapping content 222 for the electronic book 218. In an illustrative implementation, the mapping content module 252 may identify words of the reading level corpus 244 that have been tagged by the vocabulary tagging module 246 and that are associated with a particular reading level. The mapping content module 252 may utilize one or more of dictionaries, thesauruses, and lexicons along with the documents of the reading level corpus 244 to identify words that are similar in meaning to the tagged words, but of a different reading level. For example, the mapping content module 252 may identify the word "stroll" in the electronic book 218. In addition, the mapping content module 252 may identify documents of the reading level corpus 244 that also include the word "stroll" and determine that "stroll" is associated with a particular reading level. Further, by examining documents of the reading level corpus 244 in light of content included in dictionaries, thesauruses, and/or lexicons, the mapping content module 252 may determine that the word "walk" is similar in meaning to the word "stroll," but is associated with a lower reading level. The mapping content module 252 may also examine documents of the reading level corpus 244 in light of content included in dictionaries, thesauruses, and/or lexicons, and determine that the word "promenade" also has a meaning similar to "stroll," but is associated with a higher reading level. In this way, the mapping content module 252 may produce the mapping content 222 for the electronic book 218 indicating that the word "stroll" in the electronic book 218 may be replaced with "walk" in a version of the electronic book 218 associated with a lower the reading level. Additionally, the mapping content 222 may indicate that "stroll" may be replaced by "promenade" in a version of the electronic book 218 associated with a higher reading level.

Client Device Architecture

Figure 3:
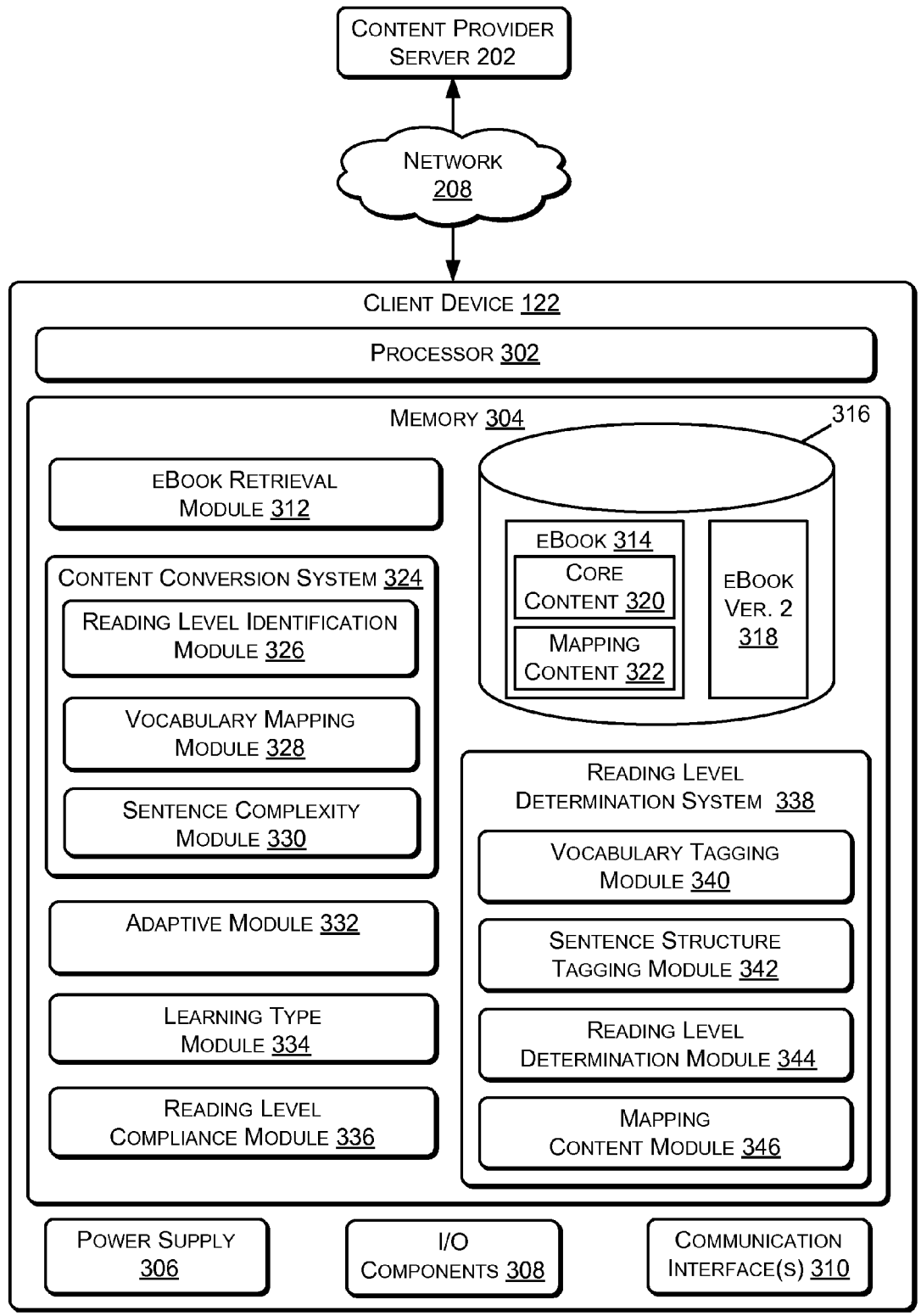
FIG. 3 is a block diagram illustrating components of a client device to provide versions of an electronic book having one or more reading levels.

FIG. 3 illustrates components of a client device 122 to provide one or more versions of electronic books having particular reading levels 2. The client device 122 includes one or more processors indicated by processor 302. In addition, the client device 122 includes memory 304. The memory 304 is an example of computer readable storage media and may include volatile memory, nonvolatile memory, removable memory, non-removable memory, or a combination thereof. Thus, the memory 304 may include, but is not limited to, RAM, ROM, EEPROM, flash memory, one or more hard disks, optical memory, or other non-transient memory technologies. The memory 304 includes a number of modules including computer-readable instructions executable by the processor 302 to obtain and/or produce versions of electronic books having different reading levels.

The client device 122 also includes a power supply (e.g. battery) 306 and input/output components 308. The input/output components 308 may include a touch screen, a keyboard, speakers, a microphone, a display device, or a combination thereof. The client device 122 also includes communication interfaces 310 to facilitate wired and/or wireless communications via the network 208 with the content provider server 202, one or more additional client devices, one or more remote devices, one or more local devices, or a combination thereof.

The memory 304 includes an eBook content retrieval module 312. The eBook content retrieval module 312 may obtain electronic books, such as the electronic book 314 from the content provider server 202, and store the electronic books in a data store 316. The electronic book 314 may be associated with a particular reading level and include words and sentence complexity corresponding to the particular reading level. Additionally, the eBook content retrieval module 312 may retrieve multiple versions of the electronic book 314 that are each associated with a particular reading level, such as the second version of the electronic book 318. The eBook content retrieval module 312 may also obtain other content related to the electronic books, such as updates to the electronic books, supplemental materials, etc.

In some instances, the eBook content retrieval module 312 may obtain core content 320 of the electronic book 314 and mapping content 322 of the electronic book 314. The core content 320 of the electronic book 314 may be foundational content of the electronic book 312. The mapping content 322 may specify changes to words and sentence complexity that modify the reading level of the core content 320. Although one instance of the mapping content 322 is shown in FIG. 3, multiple instances of mapping content for the electronic book 314 may be available. For example, the electronic book 314 may be associated with a respective mapping content version for each of a number of reading levels for the electronic book 314. The eBook content retrieval module 312 may obtain the electronic book 314 and materials related to the electronic book 314 from the content provider server 202, from a third-party, such as a publisher of the electronic book 314, or a combination thereof, in response to one or more requests sent from the eBook content retrieval module 312.

The memory 304 also includes a content conversion system 324 to produce versions of electronic books associated with a number of reading levels based on mapping content. In an illustrative implementation, the content conversion system 324 may produce the second version of the electronic book 318 from the core content 320 and the mapping content 322 of the electronic book 314. Other versions of the electronic book 314 having reading levels different from that of the second version of the electronic book 318 may also be produced utilizing the core content 320 and the mapping content 322.

In a particular implementation, the content conversion system 324 includes a reading level identification module 326 to identify a reading level of a user of the client device 122. In some cases, the reading level of the user of the client device 122 may be different from the reading level of the core content 320, the reading level of the second version of the electronic book 318, or both. When the reading level of the user of the client device 122 is the same as the reading level of the core content 320 and/or the second version of the electronic book 318, then the reading level identification module 326 may retrieve the appropriate version of the electronic book 314 from the data store 316 and, in some cases, the retrieved version of the electronic book 314 can be provided to the user of the client device 122 via the input/output components 308.

When the reading level of the user of the client device 122 is different from versions of the electronic book stored in the data store 316, the reading level identification module 326 may invoke the eBook content retrieval module 312 to send a request to the content provider server 202 or another entity, such as an educational entity server, for the version of the electronic book 314 corresponding to the reading level of the user of the client device 122. In other instances, the content conversion system 324 may utilize the core content 318 and the mapping content 320 to convert the core content 318 to a version of the electronic book 314 that corresponds to the reading level of the user of the client device 122. For example, the reading level identification module 326 may invoke a vocabulary mapping module 328 and a sentence complexity module 330 to produce the version of the electronic book 314 corresponding to the reading level of the user of the client device 122.

In an illustrative implementation, the vocabulary mapping module 328 may identify words of the core content 320 that may be replaced with words associated with a different reading level based on the mapping content 322. Additionally, the sentence complexity module 330 may identify words and/or phrases that can be added to or deleted from the core content 320 to change the reading level of the core content 320.

Further, the memory 304 includes an adaptive module 332 to identify a reading level of a particular individual and provide a version of the electronic book 314 having content appropriate for the reading capabilities of the particular individual. In a particular implementation, the adaptive module 332 may administer a reading capability assessment to identify a reading level of a particular individual. In some cases, administering the reading capability assessment may include supplying a series of reading level questions, such as reading comprehension questions, via the input/output components 308. The reading level questions may also be provided via another means, such as in paper form or audibly from a teacher. The answers to the questions are entered via one or more of the input components 308 and processed by the adaptive module 332. In some cases, the reading level questions may be related to one or more electronic books that the particular individual recently read. In other instances, the reading level questions may be based on content provided in conjunction with the reading level questions. Administering the reading capability assessment may also include conducting one or more reading accuracy, one or more reading speed tests, and so on.

Based on the answers to the reading level questions and the results of the reading accuracy and reading speed tests, the adaptive module 332 may determine a current reading level of the particular individual. The current reading level of the individual may be higher or lower than a previous reading level of the individual. Additionally, the reading level of the individual may be different from a reading level of another user of the client device 122. After determining the reading level of the particular individual, the adaptive module 332 may invoke the eBook content retrieval module 312 to identify a version of an electronic book stored in the data store 316 that is appropriate for the reading capabilities of the individual and provide the identified version of the electronic book via the client device 122. Additionally, the adaptive module 332 may invoke the content conversion system 324 to produce a version of an electronic book, such as the electronic book 314, based on the core content 320 and the mapping content 322 that is appropriate for the reading level of the individual.

In addition, the memory 304 includes a learning type module 334 to determine a learning type of a particular individual, such as a user of the client device 122. For example, by evaluating answers to questions regarding learning type, the learning type module 334 may determine whether the particular individual is a visual learner or an auditory learner. Based on the learning type of the particular individual, the learning type module 334 may identify a version of a requested electronic book, such as the electronic book 314, that includes content appropriate for the learning type of the particular individual.

The learning type module 334 may also add content to the core content 320 and/or to the second version of the electronic book 318 to adapt the content of the electronic book 314 for different learning types. In one example, the learning type module 334 may add images and/or video to the core content 320, to the second version of the electronic book 318, or a combination thereof, to accommodate a visual learner. In another example, the learning type module 334 may insert links that play an audio version of a word, sentence, and/or page of the electronic book 314 to accommodate auditory learners.

A learning type of an individual may also refer to a level of interest of particular content of an electronic book, such as the electronic book 314. For example, the higher an individual's level of interest in the content of the electronic book 314, the more material that may be provided in a particular version of the electronic book 314. On the other hand, when an individual has a low level of interest in the content of the electronic book 314, supplemental information may not be added to the core content 320 and/or the second version of the electronic book 318. In some scenarios, a level of interest of an individual may be determined based on a user profile, answers to a questionnaire, content of other electronic books purchased or otherwise consumed by the individual, or a combination thereof.

The memory 304 also stores a reading level compliance module 336 that may determine whether a version of an electronic book complies with particular reading level standards and may modify content of the electronic book to bring the electronic book into compliance with the particular reading level standards. In an illustrative implementation, a school, university, school district, state agency, national agency, or other educational entity may have standards for the vocabulary, sentence complexity, phonics, etc. that define a particular reading level. The reading level compliance module 336 may examine the content of a particular electronic book, such as the electronic book 314, and determine whether the core content 320 complies with the standards for a particular reading level. When the core content 320 does not comply with a particular standard, the reading level compliance module 336 may modify the core content 320 in conjunction with the mapping content 322 to produce another version of the electronic book 314 that does comply with the particular standard. In some cases, one or more instances of the mapping content 322 may be related to standards of one or more educational entities.

Further, the memory 304 includes a reading level determination system 338 to determine a reading level of a document, such as the electronic book 314. In particular, the reading level determination system 338 may examine the content of the document with respect to a corpus of material, such as the reading level corpus 244 of FIG. 2, to determine a reading level of the document. Additionally, and/or alternatively, the reading level of the document may be predetermined based on a reading level designated by a publisher of the document, a content provider, educational entity, or other entity. The reading level of the document may also be inferred from an intended audience for the document.

The reading level determination system 338 includes a vocabulary tagging module 340 to tag words of documents of a reading level corpus and to tag words of a document, such as the electronic book 314. In an illustrative implementation, the vocabulary tagging module 340 may tag words of documents of a reading level corpus and determine that certain words of the electronic book 314 are most often used in corpus documents of a particular reading level, while other words of the electronic book 314 are most often used in corpus documents of another reading level. The vocabulary tagging module 340 may also utilize the complexity of a word based on the length of a word and/or phonemes associated with the word to determine a reading level associated with the word.

The reading level determination system 338 also includes a sentence structure tagging module 342. The sentence structure tagging module 342 may tag phrases, clauses, parts of speech, etc. of documents of a reading level corpus and of the electronic book 314. The sentence structure tagging module 342 may implement a Hidden Markov model or another type of statistical model to tag the phrases, clauses, parts of speech, etc. of the documents of a reading level corpus and of the electronic book 314. In addition, the sentence structure tagging module 342 may indicate a reading level associated with particular clauses, phrases, and parts of speech.

The sentence structure tagging module 342 may also provide a count of one or more parts of speech, phrases, and/or clauses. For example, the sentence structure tagging module 342 may tally the number of nouns, verbs, adverbs, adjectives, prepositions, conjunctions, independent clauses, dependent clauses, etc. of documents of a reading level corpus and the electronic book 314.

Further, the reading level determination system 338 includes a reading level determination module 344 to determine a reading level of a document, such as the electronic book 314. The reading level determination module 344 may compare words of the electronic book 314 tagged by the vocabulary tagging module 340 with tagged words of the documents of a reading level corpus. Based, at least in part, on matches between the words of the electronic book 314 with words of the documents of the reading level corpus, the reading level determination module 344 may determine a reading level of the electronic book 314. Further, the reading level of the electronic book 314 may be determined according to the complexity of words of the electronic book 314 based on the length of the words, phonemes of the words, and so on.

Additionally, the reading level determination module 344 may compare clauses, phrases, and parts of speech of the electronic book 314 with clauses, phrases, and parts of speech of documents of a reading level corpus. Based, at least in part, on matches that occur between clauses, phrases, and parts of speech of the electronic book 314 with clauses, phrases, and parts of speech of the documents of the reading level corpus, the reading level determination module 344 may determine a reading level of the electronic book 314. In some cases, the reading level determination module 344 may also compare occurrences of certain parts of speech, clauses, and phrases of the electronic book 314 with occurrences of corresponding parts of speech, clauses, and phrases of documents of a reading level corpus to determine the reading level of the electronic book 314. Further, the reading level of the electronic book 314 may be determined based in part on the complexity of sentences of the electronic book 314. The complexity of the sentences of the electronic book 314 may depend on the length of the sentences, parts of speech of the sentences, phrases of the sentences, clauses of the sentences, and so on.

The reading level determination system 338 includes a mapping content module 346 to produce mapping content for electronic books, such as the mapping content 322 for the electronic book 314. In an illustrative implementation, the mapping content module 346 may identify words of a reading level corpus that have been tagged by the vocabulary tagging module 340 and that are associated with a particular reading level. The mapping content module 346 may utilize one or more of dictionaries, thesauruses, and lexicons along with the documents of a reading level corpus to identify words that are similar in meaning to the tagged words, but of a different reading level. For example, the mapping content module 346 may identify the word "stroll" in the electronic book 314. The mapping content module 346 may also examine documents of a reading level corpus in light of content included in dictionaries, thesauruses, lexicons, and so on to identify words having a similar meaning to "stroll," but having a different reading level, such as "walk" and "promenade." In this way, the mapping content module 346 may produce the mapping content 322 for the electronic book 314 indicating that the word "stroll" in the electronic book 314 may be replaced with the words "walk" and "promenade" to produce versions of the electronic book 314 associated with different reading levels.

Illustrative Reading Level Adjustment Controls and User Interface

Figure 4:
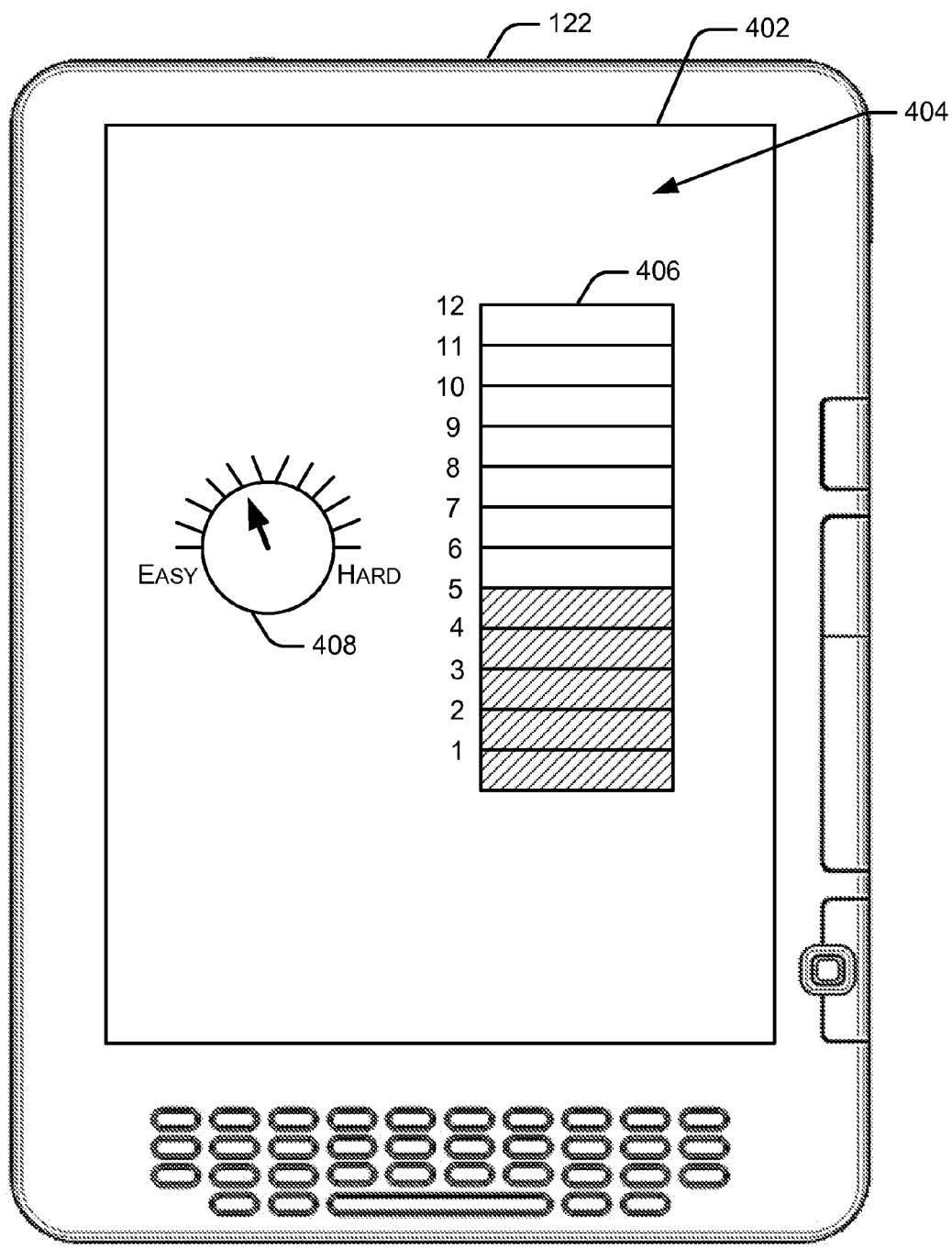
FIG. 4 is a diagram of a client device to select and display a reading level of a user of the client device.

FIG. 4 shows a client device 122 to select and display a reading level of a user of the client device 122. The client device 122 includes a display 402 showing a user interface 404. The user interface 404 includes reading level indicators 406 and 408 that indicate a reading level of a user of the client device 122. The reading level of the user of the client device 122 may indicate a reading level of electronic books provided to the user via the client device 122.

The reading level for a user of the client device 122 may be specified via one or more input devices of the client device 122. In a particular implementation, the display 402 may include a touch screen and the reading level indicators 406 and 408 may be activated by a finger or stylus. In another implementation, buttons of a keypad may be activated to specify a particular reading level. Additionally, the reading level may be set audibly via a microphone of the client device 122.

In some cases, the reading level indicators 406 and 408 may both be activated independently to specify a reading level. In other cases the reading level indicators 406 and 408 may operate in conjunction with each other. For example, the reading level indicator 408 may serve as an input device to change the reading level, while the reading level indicator 406 serves to merely display the reading level. In any case, as the reading level increases or decreases, the reading level indicators 406 and 408 may change to reflect the modification to the reading level. Further, although two reading level indicators 406 and 408 are shown in FIG. 4, the user interface 404 may include one of the reading level indicators 406 or 408 or additional reading level indicators may also be included in the user interface 404. In particular, the user interface 404 may include a reading level indicator for each user of the client device 122.

The reading level indicator 406 shown in FIG. 4 expresses the reading level of a user of the client device 122 based on the numbers 1-12 and the reading level indicator 408 expresses the reading level of the user according to dashes around a portion of a dial specifying reading levels from easy to hard. In some cases, the numbers 1-12 may refer to a grade level associated with an educational entity. The reading level indicators 406 and 408 may also show other scales that indicate the reading level of a user of the client device 122, such as the Scholastic Guided Reading levels, the Developmental Reading Assessment levels, or the Lexile levels. The reading level indicators 406 and 408 may also indicate reading level based on educational entity standards and/or objectives. In an illustrative example, an educational entity objective may relate to learning to recognize letters that produce certain sounds, such as the "f" sound, and the reading level indicator 406 may reflect levels of difficulty in mastering the objective, such as recognizing that the "f" sound may be produced by the letters "f," "gh," or "ph."

In some implementations, the reading level indicators 406 and 408 may reflect a learning type of the user of the client device 122. For example, the reading level indicators 406 and 408 may be set to indicate an auditory learner and, consequently, invoke a text-to-speech application. In another example, the reading level indicators 406 and 408 may be set to indicate a visual learner, such that images and/or video may be provided with electronic books via the client device 122.

Illustrative Application of Mapping Content to Versions of an Electronic Book

Figure 5:
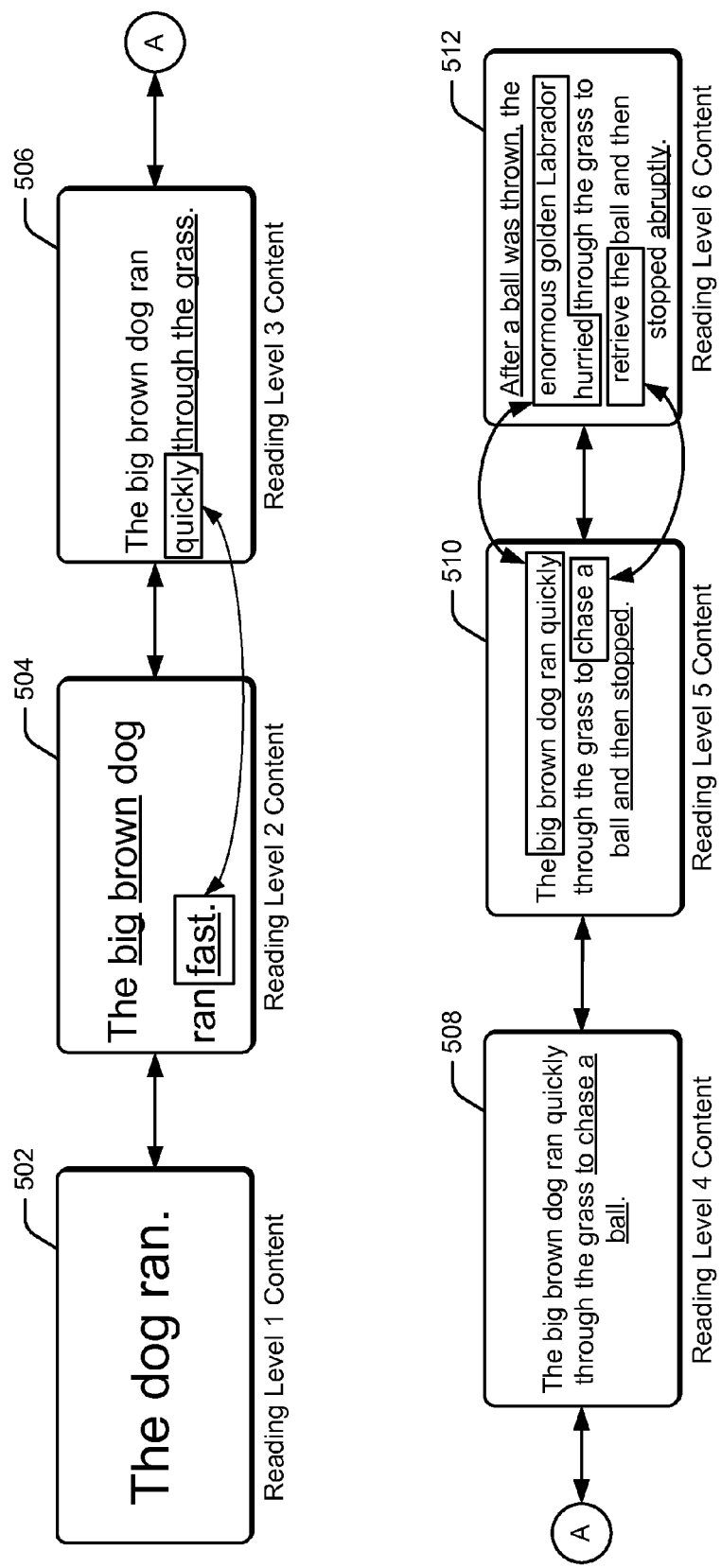
FIG. 5 shows applying mapping content to an electronic book having a particular reading level to produce versions of the electronic book having one or more different reading levels.

FIG. 5 shows applying mapping content to a version of an electronic book having a particular reading level to produce versions of the electronic book having one or more different reading levels. In particular, FIG. 5 shows converting between the sentence 502 associated with reading level 1 content 502 to the sentence 504 having reading level 2 content. In the example shown in FIG. 5, to convert the sentence 502 having reading level 1 content to the sentence 504 associated with reading level 2 content, words may be added to the sentence 502. To illustrate, the adjectives "big" and "brown" are added to qualify the noun "dog" of the sentence 502. Additionally, the adverb "fast" is added to the sentence to qualify the verb "ran" to produce the sentence 504. The font size may also change from the sentence 502 to the sentence 504. In particular, the font size of the sentence 502 is greater than the font size of the sentence 504.

Additionally, the sentence 504 can be converted from reading level 2 content to a sentence 506 having reading level 3 content. In particular, the adverb "fast" is replaced with the adverb "quickly" and the prepositional phrase "through the grass" is added to the sentence 504 to produce the sentence 506. The font size and line spacing are also changed when converting between the sentence 504 and the sentence 506. For example, the font size and line spacing are larger in the sentence 504 than in the sentence 506.

Further, the sentence 506 is converted to the sentence 508 having reading level 4 content by adding the prepositional phrase "to chase a ball." The font size, line spacing, and justification are also modified when converting between the sentence 506 and the sentence 508. For example, the font size and line spacing of the sentence 506 are larger than the font size and line spacing for the sentence 508. Additionally, the sentence 506 is left justified, while the sentence 508 is centered.

The sentence 508 is converted from reading level 4 content to reading level 5 content by producing sentence 510. The sentence 508 is modified from a simple sentence to a compound sentence by adding the independent clause "and then stopped." In another example, the sentence 510 is converted from reading level 5 content to the sentence 512 having reading level 6 content. As shown in FIG. 5, the prepositional phrase "After a ball was thrown" is added to the sentence 510 to produce the sentence 512 and the words "big brown dog ran quickly" are replaced by the words "enormous golden Labrador hurried." In addition, the sentence 510 is converted to the sentence 512 by replacing the words "chase a" with "retrieve the" and adding the adverb "abruptly" to qualify the verb "stopped."

Any of the sentences 502-512 may include reading level content that is designated as core content for an electronic book. In addition, the modifications made to convert the sentences 502-512 to content having different reading levels may be produced according to one or more instances of mapping content. For example, one instance of mapping content may be utilized to convert the sentence 502 from reading level 1 content to the sentence 504 having reading level 2 content. To illustrate, the mapping content may indicate that adding the adjectives "big" and "brown" to the sentence 502 produces the sentence 504 having a higher reading level. Similarly, an instance of mapping content can be utilized to change the sentence 504 having reading level 2 content to the sentence 506 having reading level 3 content, another instance of mapping content can be utilized to change the sentence 506 having reading level 3 content to the sentence 508 having reading level 4 content, and so on. Further, the instances of mapping content may indicate changes to sentences to decrease the reading level of content, such as by removing the adjectives "big" and "brown" and the adverb "fast" from the sentence 504 having reading level 2 content to produce the sentence 502 having reading level 1 content.

In other implementations, one instance of mapping content may include each of the changes that may be utilized to convert the sentences 502-512 to content having different reading levels. Further, one or more instances of mapping content can be used to convert content having a particular reading level to content that is multiple reading levels above or below a current reading level. For example, one or more instances of mapping content may be used to convert the sentence 502 from reading level 1 content to the sentence 508 having reading level 3 content.

Additionally, although certain substitutions and phrases are shown in FIG. 5 to convert content from one reading level to another, other substitutions may be utilized. For example, to convert the sentences 504 and 506 between reading level 3 content and reading level 4 content, rather than adding or deleting the phrase "to chase a ball," alternative phrases could be used, such as "to get a ball" or "to obtain a ball." In another example, to convert the sentences 504 and 506 between reading level 2 content and reading level 3 content, rather than substituting "fast" and "quickly," "fast" and "rapidly" may be interchanged. Further, substitutions not shown in FIG. 5 may be made to convert the sentences 502-512 to different reading levels. In a particular example, the word "quickly" in the sentence 508 may be interchanged with the idiom "in a flash" in the sentence 510 to convert between reading level 4 content and reading level 5 content.

Illustrative Processes

FIGS. 6-11 show processes 600-1100 respectively, to provide electronic books according to reading capability. The processes 600-1100 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 6:
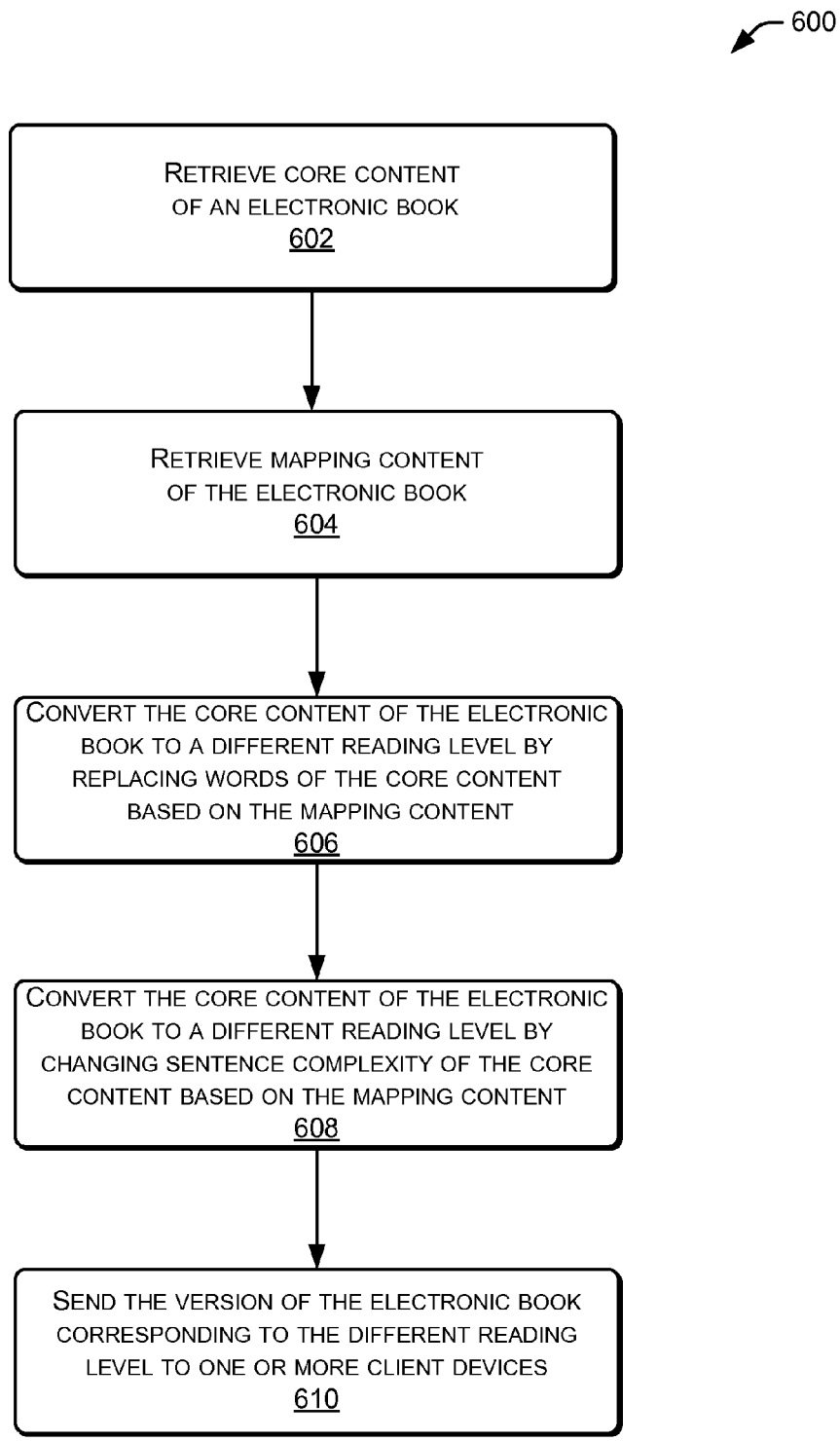
FIG. 6 is a flow diagram of a process for a content provider or other entity (e.g., an educational entity) to produce versions of an electronic book associated with a plurality of reading levels and to send a particular version of the electronic book to a client device.

FIG. 6 shows a process 600 for a content provider or educational entity to produce electronic books of a plurality of reading levels and to send an electronic book of a particular reading level to a client device. At 602, electronic book core content is retrieved. In a particular example, a content provider may obtain core content of an electronic book from a publisher of the electronic book. The core content of the electronic book may be associated with a particular reading level. In another example, the core content may have been previously obtained from the publisher and the content provider retrieves the core content of the electronic book from a data store of the content provider.

At 604, mapping content of the electronic book may be retrieved. In an illustrative implementation, the mapping content of the electronic book may be retrieved from the publisher of the electronic book. In another implementation, the mapping content may be retrieved from a third party or the mapping content may be produced by the content provider and stored in a data store of the content provider.

At 606, the core content of the electronic book is converted to a different reading level by replacing words of the core content based on the mapping content. To illustrate, one or more instances of mapping content may indicate that certain words of the electronic book can be replaced with corresponding synonyms in order to change the core content to a higher reading level, to a lower reading level, or a combination thereof.

At 608, the core content of the electronic book is converted to a different reading level by changing the complexity of sentences of the core content based on the mapping content. For example, one or more instances of the mapping content may indicate words, such as adjective and adverbs, that can be added to a sentence or taken out of the sentence to change the reading level of the sentence. In another example, one or more instances of the mapping content may indicate phrases, such as prepositional phrases, adverb phrases, adjective phrases, noun phrases, verb phrases, idioms, or a combination thereof, that can be added to or taken out of a sentence to change the reading level of the sentence. In a further example, one or more instances of the mapping content may indicate conjunctions and independent clauses that can be utilized to produce a compound sentence or removed to produce a simple sentence in order to change the reading level of the sentence.

At 610, a version of the electronic book that corresponds to a different reading level from the core content is sent to one or more client devices. In a particular implementation, a content provider may receive a request from the one or more client devices for a particular version of the electronic book and, in response, provide the version of the electronic book having a different reading level to the one or more client devices. In some scenarios, one or more of the operations of 602-608 may be executed in response to receiving the request for a particular version of the electronic book from a client device (e.g., in response to a user of the client device 122 altering a reading level as described with respect to FIG. 4).

Figure 7:
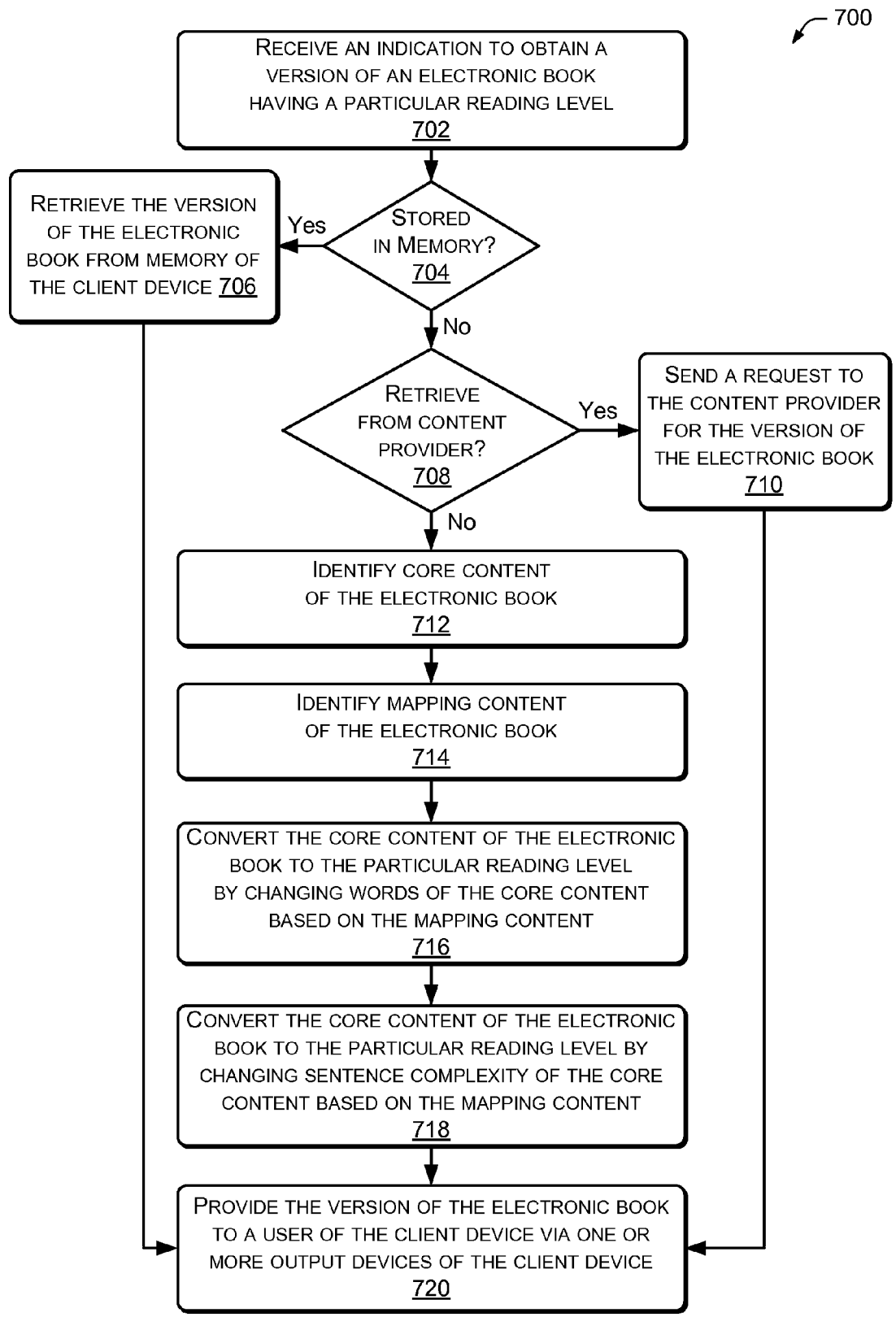
FIG. 7 is a flow diagram of a process for a client device to produce a version of an electronic book associated with a particular reading level.

FIG. 7 shows a process 700 for a client device to provide electronic books of a particular reading level to a user of the client device. At 702, the client device receives an indication to obtain a version of an electronic book having a particular reading level. For example, a request for the version of the electronic book having the particular reading level may be entered by a user of the client device via one or more input devices of the client device.

At 704, the client device determines whether the version of the electronic book having the particular reading level is stored in memory of the client device. When the version of the electronic book having the particular reading level is stored in the memory of the client device, the process 700 proceeds to 706 and the client device retrieves the version of the electronic book having the particular reading level from the memory of the client device and the process 700 moves to 720. When the version of the electronic book having the particular reading level is not stored in the memory of the client device, the process 700 moves to 708.

At 708, the client device determines whether the version of the electronic book having the particular reading level is to be retrieved from a content provider. For example, the client device may determine whether the client device includes a content conversion system, such as the content conversion system 324 of FIG. 3, and/or whether core content and mapping content are stored at the client device in order to determine whether the electronic book having the particular reading level is to be retrieved from the content provider. When the electronic book having the particular reading level is to be retrieved from the content provider, that is the client device does not include a content conversion system and/or does not store core content and mapping content of the electronic book, then the process 700 advances to 710. At 710, the client device sends a request to the content provider for the version of the electronic book having the particular reading level and the process 700 moves to 720. Otherwise, the process 700 moves from 708 to 712.

At 712, core content of the electronic book is identified. For example, core content of the electronic book stored in memory of the client device may be accessed. At 714, mapping content of the electronic book is identified. In an illustrative implementation, the mapping content of the electronic book stored in memory of the client device is accessed.

At 716, the core content of the electronic book is converted to the particular reading level by changing words of the core content based on the mapping content. For example, specified words of the core content may be replaced with more complicated words to convert the core content to a higher reading level. In another example, particular words of the core content may be replaced with simpler words to convert the core content to a lower reading level.

At 718, the core content of the electronic book is converted to the particular reading level by changing the complexity of sentences of the core content based on the mapping content. In some cases, words and/or phrases may be added to the core content to increase the reading level of the core content to the particular reading level. In other cases, words and/or phrases may be removed from the core content to decrease the reading level of the core content to the particular reading level.

At 720, the version of the electronic book having the particular reading level is provided to a user of the client device via one or more output devices of the client device. For example, words, images, video, or a combination thereof, may be provided via a display of the client device. Additionally, audio associated with the particular version of the electronic book may be provided via speakers of the client device.

Figure 8:
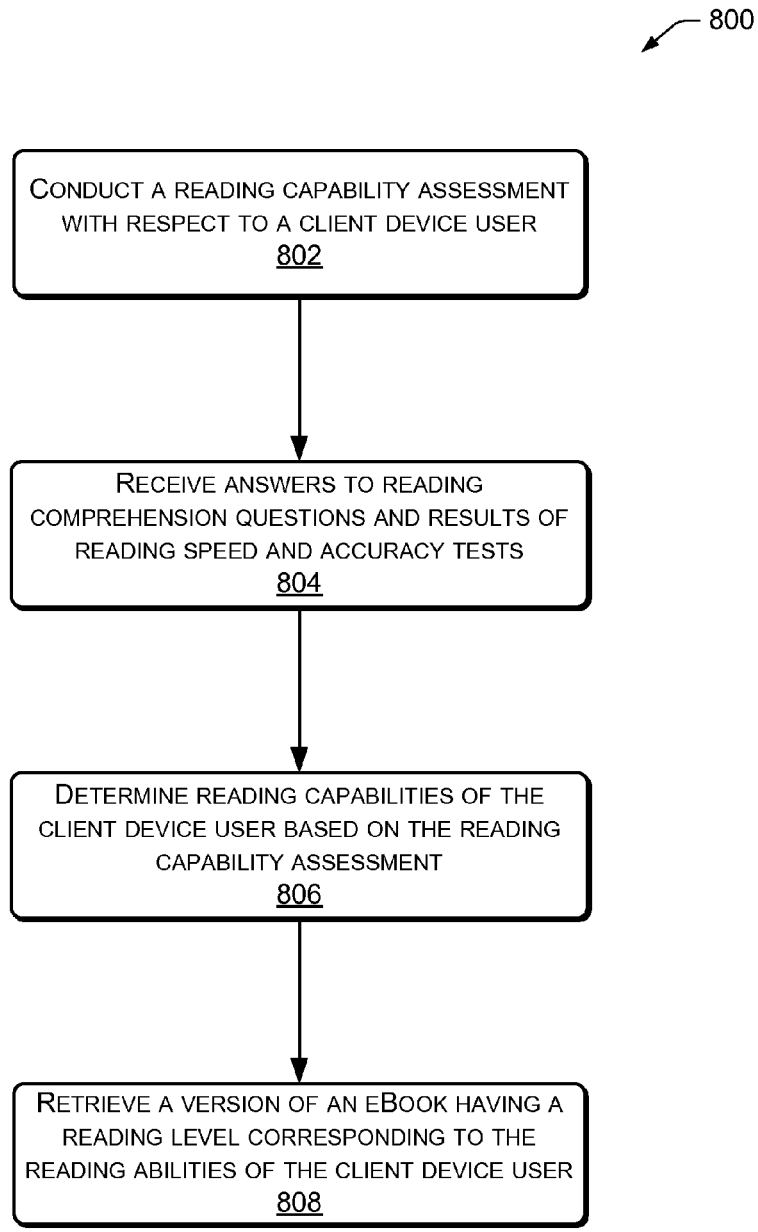
FIG. 8 is a flow diagram of a process to provide a version of an electronic book to a client device having a reading level that is appropriate for the reading capabilities of a particular user of the client device.

FIG. 8 shows a process 800 to provide an electronic book to a client device having a reading level that is appropriate for the reading capabilities of a particular user of the client device. At 802, a reading capability assessment is conducted. The reading capability assessment may include one or more reading speed tests, one or more reading accuracy tests, and so on. The reading capability assessment may also include providing reading level questions, such as reading comprehension questions, to a client device user. The reading level questions may be related to one or more books or electronic books that the client device user has read recently. The reading level questions may also be related to passages provided with the reading level questions. In some cases, the reading level questions may be provided to the client device user via a display of the client device. In other cases, the reading level questions may be provided to the client device user audibly via speakers of the client device or via another individual. Further, a paper version of the reading level questions may be provided to the client device user. The reading level questions may have a level of difficulty based on a current reading level of the client device user, a previous reading level of the client device user, a reading level above the current reading level of the client device user, a predicted reading level of the client device user, or a combination thereof.

At 804, the client device receives answers to the reading level questions. In particular, input devices of the client device, such as a keyboard, pointer device, touch screen, microphone, etc. may be utilized to provide the answers to the reading level questions. In addition, the client device accesses the results of the reading speed and reading accuracy tests.

At 806, the reading capabilities of the client device user are determined based on the answers to the reading level questions and based on the results of the reading speed and reading accuracy tests. For example, predetermined answers to the reading level questions may correspond to particular reading capabilities. The answers of the client device user to the reading level questions may be compared with the predetermined answers to the reading level questions in order to determine the reading capabilities of the client device user. Additionally, particular results of the reading speed and accuracy tests may be associated with corresponding reading capabilities. In some situations, the reading capabilities of the client device user may be expressed as a particular reading level. Further, the reading level of the client device user may be set as a default reading level of the client device.

Although not shown in FIG. 8, the process may return to 802 from 806 to provide reading level questions associated with another reading level. For example, when a client device user provides certain answers to the reading level questions, additional reading level questions at a higher reading level may be provided to the client device user to determine the reading capabilities of the client device user. In another example, a second set of reading level questions at a lower reading level may be provided to the client device user based on the answers to the first set of reading level questions. This may continue until a reading level of the user is adequately determined.

At 808, a version of an electronic book is retrieved that has a reading level corresponding to the reading capabilities of the client device user. In an illustrative implementation, a request may be sent from the client device to a content provider for a version of the electronic book having the reading level corresponding to the reading capabilities of the client device user. Upon receipt, the requested version of the electronic book may be stored on the client device or provided to the client device user via one or more output devices of the client device.

Figure 9:
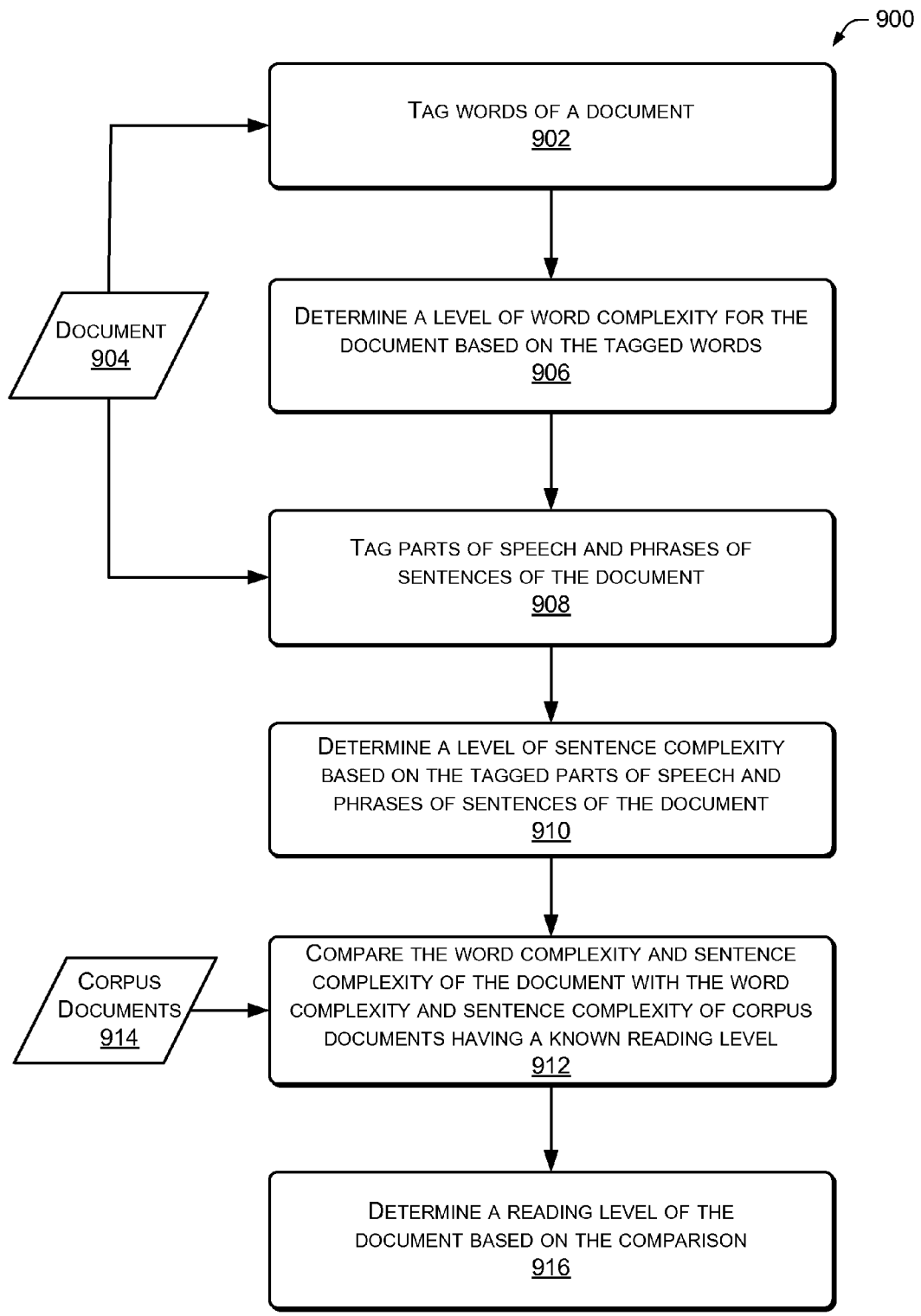
FIG. 9 is a flow diagram of a process to determine a reading level of a document based on content of documents of a corpus having a predetermined reading level.

FIG. 9 shows a process 900 to determine a reading level of a document based on content of documents of a corpus having a predetermined reading level. The document may be an electronic book, a document included in a corpus of material, or a combination thereof. At 902, words of a document 904 are tagged. In particular, words of the document 904 may be assigned a particular level of complexity based on length of the words, phonemes of the words, and so on. In one example, the word "slow" may be tagged with a lower level of complexity than the word "sluggish." In some cases, the number of words having a particular level of complexity may be tracked and counted to determine an overall number of words of the document 904 having a particular level of complexity. For example, the document 904 may include a certain number of words associated with a high level of complexity, another number of words associated with a medium level of complexity, and so on. In some cases, all words of the document 904 may be tagged, while in other cases, a sample of the words of the document may be tagged.

At 906, a level of word complexity for the document 904 is determined based on the levels of complexity of the tagged words. For example, when the document 904 has larger numbers of complex words, the document may be assigned a higher level of word complexity than when the document 904 includes a large number of simple words with few complex words.

At 908, parts of speech and phrases of sentences of the document 904 are tagged. For example, words of the sentences may be tagged as nouns, verbs, adverbs, adjectives, conjunctions, pronouns, prepositions, etc. Additionally, phrases of the sentences may be tagged as noun phrases, verb phrases, adverb phrases, adjective phrases, prepositional phrases, idioms, and so on. At 910, a level of sentence complexity is determined for the document 904 based on the tagged parts of speech and phrases of the document 904. For example, sentences having more parts of speech and more phrases may be assigned a higher level of sentence complexity than sentences with fewer parts of speech and fewer phrases. In an illustrative implementation, sentences with higher numbers of nouns, verbs, adverbs, adjectives, or a combination thereof, may have a higher reading level. In some cases, an overall level of sentence complexity is determined for the document 904 based on the level of complexity of individual sentences of the document 904.

At 912, the level of word complexity and sentence complexity of the document 904 are compared with the level of word complexity and sentence complexity of corpus documents 914 having a predetermined reading level. In an illustrative example, corpus documents 914 may have been assigned a reading level by a content provider or by another entity, such as an educational entity or publisher, based on particular standards. At 916, a reading level of the document 904 is determined based on the comparison between the word complexity and sentence complexity of the document 904 with the word complexity and sentence complexity of the corpus documents 914. In particular, corpus documents 914 with a level of word complexity similar to those of the document 904 may be identified. Additionally, corpus documents 914 having sentence complexity similar to that of the document 904 may also be identified. In this way, a reading level of the document 904 may be determined by identifying corpus documents 912 having similar word complexity and sentence complexity and assigning an appropriate reading level to the document 904 based on the extent of the similarities.

Figure 10:
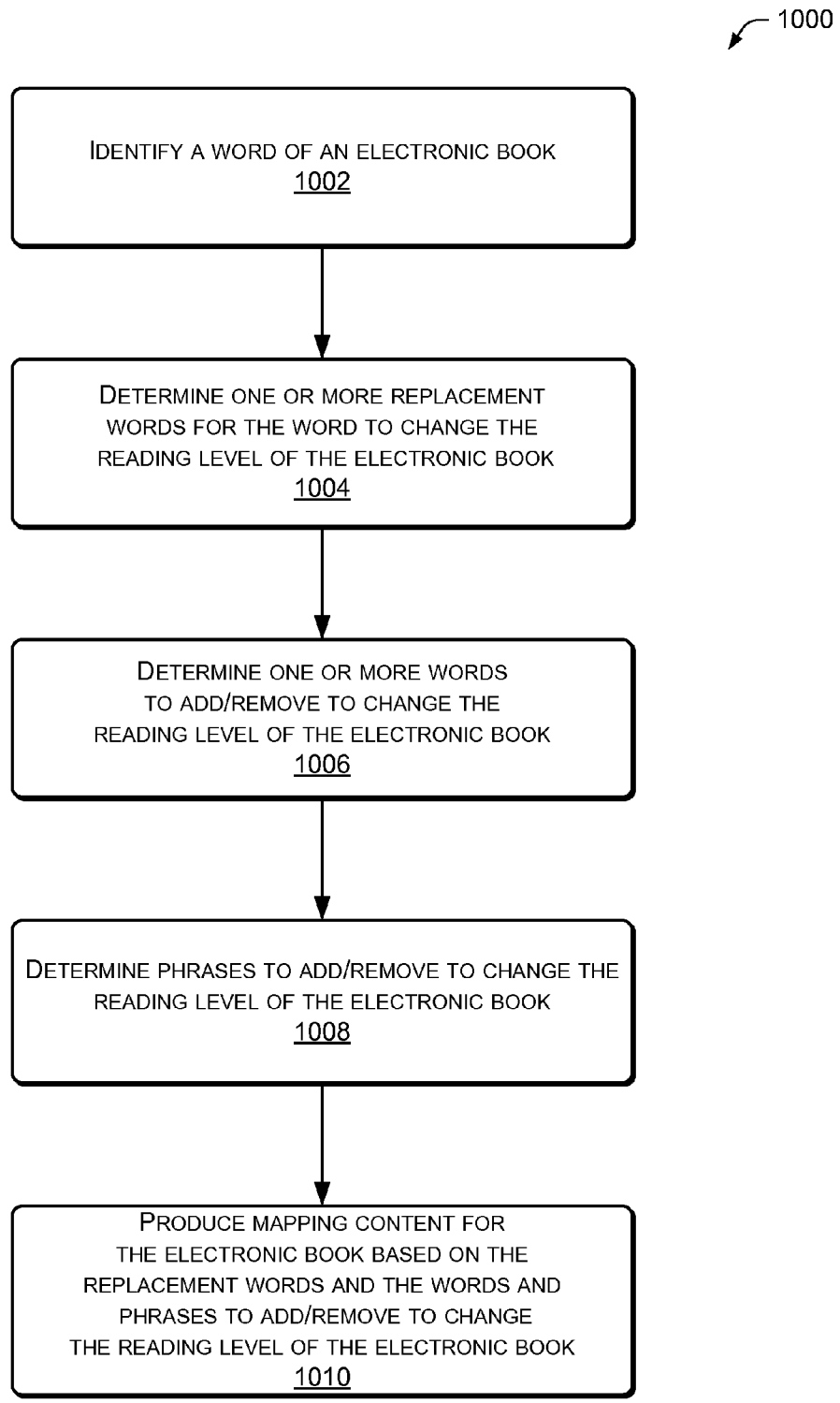
FIG. 10 is a flow diagram of a process to produce mapping content for an electronic book.

FIG. 10 shows a process 1000 to produce mapping content for an electronic book. At 1002, a word of an electronic book is identified and at 1004, replacement words are determined to change the reading level of the electronic book. For example, a corpus of material including thesauruses, dictionaries, other reference books, other documents, etc. are examined to identify synonyms of the identified word that may be associated with different reading levels. For example, the word "walk" may be identified in the document and replacement words, such as "go" and "stroll" may be determined. In some instances, the word "go" may be associated with a lower reading level than the word "walk," while the word "stroll" is associated with a higher reading level.

At 1006, words may be determined that can be added to or removed from sentences of the electronic book to change the reading level of the electronic book. In an illustrative implementation, adverbs and adjectives can be identified to modify verbs and nouns of sentences of the electronic book. By adding adverbs and adjectives to sentences of the electronic book, the reading level of the electronic book may be increased, while removing adverbs and adjectives from sentences of the electronic book may decrease the reading level of the electronic book.

At 1008, phrases may be determined to add to or remove from sentences of the electronic book to change the reading level of the electronic book. In particular, prepositional phrases, adverb phrases, noun phrases, verb phrases, adjective phrases, idioms, etc. may be added to sentences of the electronic book to increase a reading level of the electronic book. In addition, phrases may be removed from the electronic book to decrease the reading level of the electronic book. In some cases, the reading level of sentences of the electronic book may be increased by multiple reading levels through the addition of multiple phrases. Conversely, the reading level of sentences of the electronic book may decrease by multiple reading levels through the removal of multiple phrases from sentences of the electronic book.

At 1010, one or more instances of mapping content for the electronic book are produced based on the replacement words and the words and phrases that may be added to or removed from sentences of the electronic book to change the reading level of the electronic book. For example, the mapping content may indicate words that can be substituted for words of the electronic book to change the reading level of the electronic book. The mapping content may also specify adverbs and adjectives to add to sentences of the electronic book and nouns and verbs of the electronic book that can be modified by the adverbs and adjectives. In some scenarios, the mapping content may indicate candidate nouns that can be modified by specified adjectives and candidate verbs that can be modified by certain adverbs to change the reading level.

Further, the mapping content may indicate phrases to add to sentences of the electronic book and candidate sentences that the phrases may be added to or removed from in order to change the reading level of the electronic book. In some cases, an instance of the mapping content may be utilized to convert the electronic book from one particular reading level to another particular reading level. In other cases, a single instance of the mapping content may be utilized to convert between multiple versions of the electronic book with each version being associated with a particular reading level.

Figure 11:
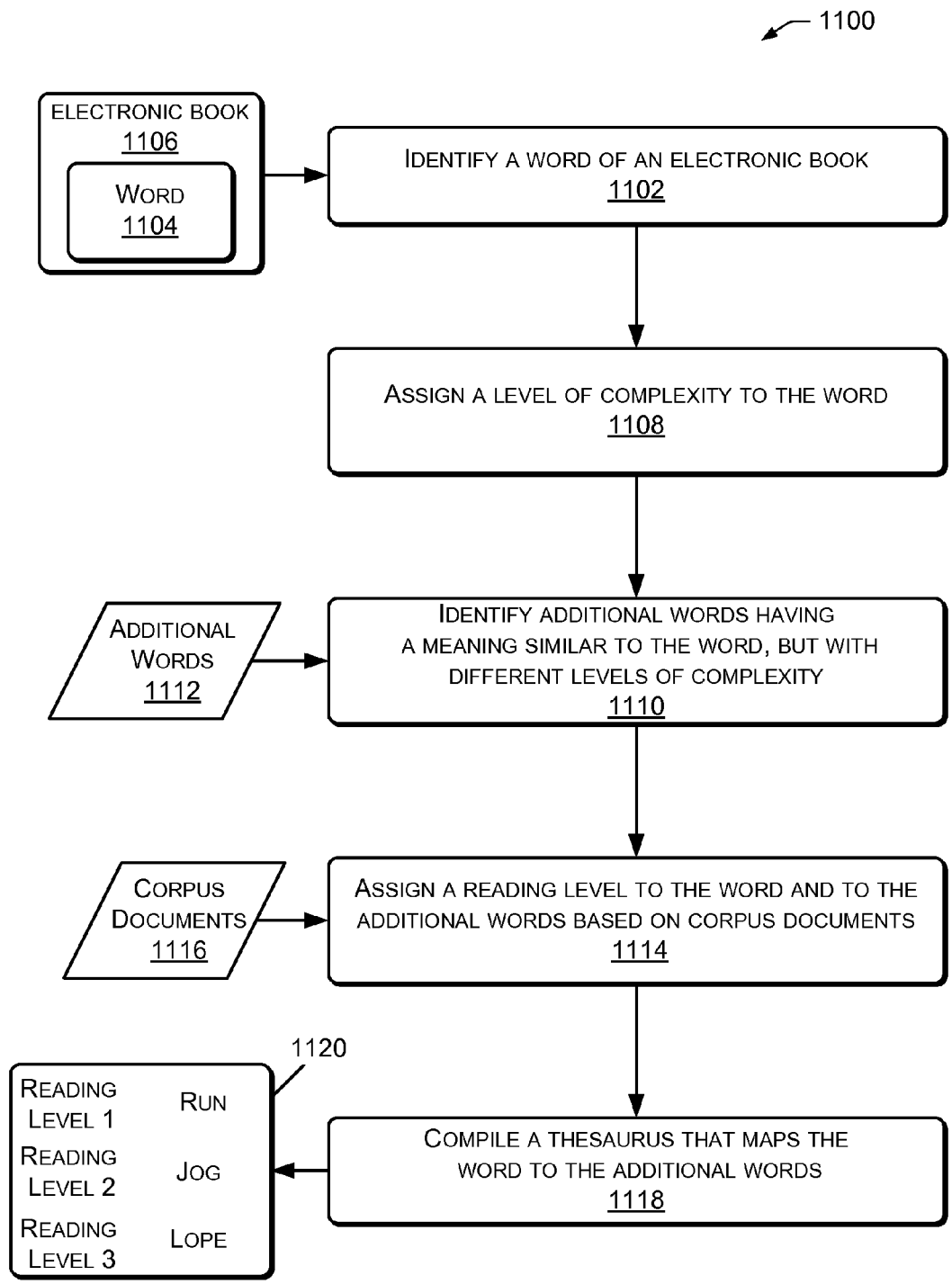
FIG. 11 is a flow diagram of a process to build a thesaurus of mapping content from a corpus of documents.

FIG. 11 shows a process 1100 to build a thesaurus of mapping content from a corpus of documents. The documents of the corpus may be associated with a predetermined reading level. For example, the documents of the corpus may be associated with a reading level assigned by a publisher of the documents, a content provider of the documents, an educational entity, another entity, or a combination thereof. The reading levels of the respective documents of the corpus may be specified in metadata associated with each of the documents of the corpus.

At 1102, a word 1104 of a document, such as an electronic book 1106, is identified. At 1108, a level of complexity is assigned to the word 1104 based on length of the word, phonemes of the word, other criteria, or a combination thereof. At 1110, additional words 1112 having a meaning similar to the word 1104, but with levels of complexity different from the word 1104 are identified. To illustrate, thesauruses, lexicons, dictionaries, other documents, or a combination thereof, are searched to identify the additional words 1112 that have meanings similar to the word 1104, such as synonyms. In addition, the level of complexity of the additional words 1112 may be determined based on length of the additional words 1112, phonemes of the additional words 1112, other criteria, etc.

At 1114, respective reading levels are assigned to the word 1104 and the additional words 1112 to indicate a version of the electronic book 1106 that includes the word 1104 and versions of the electronic book 1106 that include the additional words 1112. For example, the word 1104 may be included in a version of the electronic book 1106 having a first reading level, while the additional words 1112 are included in versions of the electronic book 1106 having additional reading levels.

The reading level assigned to the word 1104 may be based on the reading levels of corpus documents 1116 that include the word 1104 and the reading levels assigned to the additional words 1112 may be based on the reading levels of the corpus documents 1116 that include the additional words 1112. For example, an average of the reading levels of the corpus documents 1116 including the word 1104 may be assigned to the word 1104. Further, a weighted average of reading levels of the corpus documents 1114 including the word 1104 may be determined to assign a reading level to the word 1104. Reading levels may also be assigned to respective additional words 1112 using an average or weighted average of the reading levels of the corpus documents 1116 including the respective additional words 1112.

At 1118, a thesaurus 1120 is compiled that maps the word 1104 to the additional words 1112. In some cases, the thesaurus 1120 may be part of mapping content for the electronic book 1106 that indicates certain additional words 1112 that can replace the word 1104 to increase or decrease the reading level of the electronic book 1106. In the illustrative example shown in FIG. 11, the word 1104 may be "jog," which is associated with a version of the electronic book 1106 having a reading level 2, and is mapped to the additional word 1112 "run" associated with a version of the electronic book 1106 having a reading level 1. In addition, the words "jog" and "run" may be mapped to the additional word 1112 "lope" associated with a version of the electronic book 1106 having a reading level 3. Thus, the word "run" can replace the word "jog" when producing a version of the electronic book 1104 having reading level 1 content and the word "lope" can replace the word "jog" when producing a version of the electronic book 1104 having reading level 3 content.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system comprising:
   one or more processors; and
   memory accessible by the one or more processors, the memory storing:
      a reading level determination system including:
         a vocabulary tagging module executable by the one or more processors to tag words within a document;
         a sentence structure tagging module to tag phrases within the document, clauses within the document, parts of speech within the document, or a combination thereof; and
         a reading level determination module to determine a reading level of the document based at least in part on the words, the phrases, the clauses, the parts of speech, or a combination thereof, and based at least in part on reading levels of documents within a corpus.

2. The computing system of claim 1, wherein the vocabulary tagging module is further executable by the one or more processors to determine a reading level of a particular word within the document based at least in part on the reading levels of the documents within the corpus that include the particular word, the reading level of the particular word indicating a version of an electronic book that includes the particular word and is associated with the reading level.

3. The computing system of claim 1, wherein the vocabulary tagging module is further executable by the one or more processors to determine a level of complexity of a particular word within the document based at least in part on a length of the word, phonemes of the word, or a combination thereof.

4. The computing system of claim 1, wherein the vocabulary tagging module is further executable by the one or more processors to determine a number of words within the document having a particular level of complexity.

5. The computing system of claim 1, wherein the sentence structure tagging module is further executable by the one or more processors to implement a Hidden Markov model to tag the phrases, the parts of speech, the clauses, or a combination thereof.

6. The computing system of claim 1, wherein the sentence structure tagging module is further executable by the one or more processors to determine a reading level of the phrases, the parts of speech, the clauses, or a combination thereof, the reading level indicating a version of an electronic book that includes the phrases, the parts of speech, the clauses, or a combination thereof, and is associated with the reading level.

7. The computing system of claim 1, wherein the sentence structure tagging module is further executable by the one or more processors to provide a count of a number of particular parts of speech within the document, a count of a number of particular phrases within the document, a count of a number of particular clauses within the document, or a combination thereof.

8. The computing system of claim 1, wherein the reading level determination module is further executable by the one or more processors to determine the reading level of the document based at least in part on matches between the words within the document and words of the documents within the corpus, the documents within the corpus having predetermined reading levels.

9. The computing system of claim 1, wherein the reading level determination module is further executable by the one or more processors to determine the reading level of the document based at least in part on matches between at least one of the phrases, the clauses, and the parts of speech within the document, and corresponding phrases, clauses, and parts of speech of the documents within the corpus.

10. The computing system of claim 1, wherein the reading level determination module is further executable by the one or more processors to determine the reading level of the document based at least in part on a number of occurrences of the phrases, the clauses, or the parts of speech in relation to corresponding occurrences of the phrases, the clauses, or the parts of speech within the documents of the corpus.

11. The computing system of claim 1, wherein the reading level determination module is further executable by the one or more processors to determine the reading level of the document based at least in part on a length of sentences within the document.

12. A computer-readable storage media storing computer-readable instructions that, when executed, instruct a processor to perform operations comprising:
   determining a reading level of a first version of an electronic book based at least in part on reading levels of documents within a corpus; and
   producing mapping content for the electronic book to produce a second version of the electronic book having a reading level that is different than the reading level of the first version of the electronic book, the mapping content comprising:
      one or more replacements words to substitute for one or more words within the first version of the electronic book;
      one or more words to add to or remove from sentences of the first version of the electronic book; or
      one or more phrases to add to or remove from the sentences of the first version of the electronic book.

13. The computer-readable storage media of claim 12, wherein the mapping content comprises the one or more replacement words, and wherein the one or more replacement words comprise synonyms for respective words within the first version of the electronic book.

14. The computer-readable storage media of claim 13, wherein the one or more replacement words are determined by examining thesauruses, dictionaries, or lexicons.

15. The computer-readable storage media of claim 13, wherein the one or more replacement words are associated with versions of the electronic book that are different from the first version of the electronic book.

16. The computer-readable storage media of claim 12, wherein the mapping content comprises the one or more words to add to the sentences of the first version of the electronic book, and wherein the one or more words include adverbs, adjectives, or a combination thereof.

17. The computer-readable storage media of claim 12, wherein the mapping content comprises the one or more phrases to add to the sentences of the first version of the electronic book, and wherein the one or more phrases include prepositional phrases, adverb phrases, adjective phrases, noun phrases, verb phrases, idioms, or a combination thereof.

18. The computer-readable storage media of claim 12, wherein the mapping content comprises the one or more replacement words, the one or more words to remove from the sentences of the electronic book, the one or more phrases to remove from the sentences of the electronic book, or a combination thereof, and wherein the reading level of the second version of the electronic book is less than the reading level of the first version of the electronic book.

19. The computer-readable storage media of claim 12, wherein the mapping content comprises the one or more replacement words, the one or more words to add to the sentences of the electronic book, the one or more phrases to add to the sentences of the electronic book, or a combination thereof, and wherein the reading level of the second version of the electronic book is greater than the reading level of the first version of the electronic book.

20. A computer-implemented method, comprising:
under control of one or more computing systems configured with specific executable instructions,
identifying a word of an electronic book;
assigning a level of complexity to the word based on a length of the word, phonemes of the word, or a combination thereof;
identifying a synonym of the word with a different level of complexity than the level of complexity of the word;
assigning a first reading level to the word based on documents of a corpus that include the word, the first reading level indicating a first version of the electronic book that includes the word and is associated with a particular reading level; and
assigning a second reading level to the synonym based on the documents of the corpus that include the synonym, the second reading level indicating a second version of the electronic book that includes the synonym and is associated with a different reading level.

21. The computer-implemented method of claim 20, further comprising examining thesauruses, dictionaries, lexicons, or a combination thereof, to identify the synonym.

22. The computer-implemented method of claim 21, further comprising compiling a thesaurus that maps the word to the synonym and that stores respective readings levels in association with the word and the synonym.

23. The computer-implemented method of claim 22, wherein the thesaurus is included in mapping content of the electronic book, the mapping content for converting the electronic book from the particular reading level to the different reading level.

24. The computer-implemented method of claim 23, further comprising converting the electronic book from the particular reading level to the different reading level, the converting including replacing the word of the electronic book with the synonym.

25. The computer-implemented method of claim 23, wherein the different reading level comprises a higher reading level or a lower reading level than the particular reading level.

* * * * *